(12) United States Patent
Apte et al.

(10) Patent No.: US 12,129,791 B2
(45) Date of Patent: Oct. 29, 2024

(54) BAFFLED THERMOCLINES IN THERMODYNAMIC CYCLE SYSTEMS

(71) Applicant: MALTA INC., Cambridge, MA (US)

(72) Inventors: Raj Apte, Mountain View, CA (US); Philippe Larochelle, Mountain View, CA (US)

(73) Assignee: MALTA INC., Cambridge, MA (US)

( * ) Notice: Subject to any disclaimer, the term of this patent is extended or adjusted under 35 U.S.C. 154(b) by 0 days.

(21) Appl. No.: 18/113,729

(22) Filed: Feb. 24, 2023

(65) Prior Publication Data

US 2023/0193820 A1 Jun. 22, 2023

Related U.S. Application Data

(63) Continuation of application No. 17/365,341, filed on Jul. 1, 2021, now Pat. No. 11,591,956, which is a continuation of application No. 15/392,542, filed on Dec. 28, 2016, now Pat. No. 11,053,847.

(51) Int. Cl.

| | |
|---|---|
| *F02C 6/14* | (2006.01) |
| *F02C 1/04* | (2006.01) |
| *F02C 1/10* | (2006.01) |
| *F28D 20/00* | (2006.01) |
| *F28F 13/14* | (2006.01) |

(52) U.S. Cl.
CPC ............... *F02C 6/14* (2013.01); *F02C 1/04* (2013.01); *F02C 1/10* (2013.01); *F28D 20/0056* (2013.01); *F28F 13/14* (2013.01); *F28D 2020/0086* (2013.01); *Y02E 60/14* (2013.01)

(58) Field of Classification Search
CPC .......... F02C 6/14; F28D 17/00; F28D 17/005; F28D 17/02; F28D 17/04; F28D 20/0056; F28D 2020/0086; F28F 13/14; F28F 13/003; F28F 13/06
See application file for complete search history.

(56) References Cited

U.S. PATENT DOCUMENTS

| | | |
|---|---|---|
| 1,576,019 A | 3/1926 | Samuel |
| 1,758,567 A | 5/1930 | Fernandez |
| 1,881,965 A | 10/1932 | Moroni et al. |
| 2,065,974 A | 12/1936 | Fritz et al. |

(Continued)

FOREIGN PATENT DOCUMENTS

| | | |
|---|---|---|
| CA | 2794150 C | 3/2018 |
| CA | 2952387 C | 2/2019 |

(Continued)

OTHER PUBLICATIONS

Ackeret et al., "Aerodynamic Heat-Power Engine Operating On A Closed Cycle," NACA Technical Memorandum, No. 1034, Nov. 1942, 35 pages.

(Continued)

*Primary Examiner* — Alain Chau
(74) *Attorney, Agent, or Firm* — Barnes & Thornburg LLP

(57) ABSTRACT

Solid-state thermoclines with internal baffle structures are in used in place of heat exchangers in a closed thermodynamic cycle power generation or energy storage system, such as a closed Brayton cycle system. The baffles limit the conductive and/or radiative transfer of heat between a solid thermal medium within different zones defined by the baffle structures.

26 Claims, 12 Drawing Sheets

(56) References Cited

U.S. PATENT DOCUMENTS

| | | |
|---|---|---|
| 2,171,253 A | 8/1939 | Day |
| 2,172,910 A | 9/1939 | Keller |
| 2,203,731 A | 6/1940 | Keller |
| 2,246,513 A | 6/1941 | Hammond |
| 2,319,995 A | 5/1943 | Keller |
| 2,336,178 A | 12/1943 | Keller |
| 2,414,170 A | 1/1947 | Salzmann |
| 2,446,108 A | 7/1948 | Salzmann |
| 2,453,886 A | 11/1948 | Ackeret et al. |
| 2,454,358 A | 11/1948 | Traupel |
| 2,566,817 A | 9/1951 | Yellin |
| 2,689,680 A | 9/1954 | Lovesey |
| 2,697,326 A | 12/1954 | Featonby |
| 2,788,195 A | 4/1957 | Karmazin |
| 2,791,204 A | 5/1957 | Andrus |
| 2,820,348 A | 1/1958 | Sauter |
| 2,860,493 A | 11/1958 | Capps et al. |
| 2,911,792 A | 11/1959 | Herre |
| 3,152,442 A | 10/1964 | Rowekamp |
| 3,218,807 A | 11/1965 | Max et al. |
| 3,220,191 A | 11/1965 | Berchtold |
| 3,285,567 A | 11/1966 | Richardson |
| 3,352,774 A | 11/1967 | Williams |
| 3,537,517 A | 11/1970 | Doyle |
| 3,630,022 A | 12/1971 | Jubb |
| 3,797,516 A | 3/1974 | Forster et al. |
| 3,818,697 A | 6/1974 | Gilli |
| 3,859,795 A | 1/1975 | Frutschi |
| 3,895,492 A | 7/1975 | Forster et al. |
| 3,897,170 A | 7/1975 | Darvishian |
| 3,955,359 A | 5/1976 | Yannone et al. |
| 4,024,908 A | 5/1977 | Meckler |
| 4,054,124 A | 10/1977 | Knoos |
| 4,089,744 A | 5/1978 | Cahn |
| 4,094,148 A | 6/1978 | Nelson |
| 4,110,987 A | 9/1978 | Cahn et al. |
| 4,117,682 A | 10/1978 | Smith |
| 4,124,061 A | 11/1978 | Mitchell et al. |
| 4,126,291 A | 11/1978 | Gilbert et al. |
| 4,148,191 A | 4/1979 | Frutschi |
| 4,158,384 A | 6/1979 | Brautigam |
| 4,215,553 A | 8/1980 | Poirier et al. |
| 4,362,290 A | 12/1982 | Marx et al. |
| 4,405,010 A | 9/1983 | Schwartz |
| 4,408,654 A | 10/1983 | Doomernik |
| 4,430,241 A | 2/1984 | Fiorucci |
| 4,438,630 A | 3/1984 | Rowe |
| 4,444,024 A | 4/1984 | Mcfee |
| 4,479,352 A | 10/1984 | Yamaoka et al. |
| 4,523,629 A | 6/1985 | Copeland |
| 4,566,668 A | 1/1986 | Koppenberg |
| 4,583,372 A | 4/1986 | Egan et al. |
| 4,628,692 A | 12/1986 | Pierce |
| 4,630,436 A | 12/1986 | Frutschi |
| 4,643,212 A | 2/1987 | Rothrock |
| 4,670,205 A | 6/1987 | Montierth |
| 4,715,576 A | 12/1987 | Montierth |
| 4,727,930 A | 3/1988 | Bruckner et al. |
| 4,872,307 A | 10/1989 | Nakhamkin |
| 5,131,231 A | 7/1992 | Trimble et al. |
| 5,160,689 A | 11/1992 | Kamen |
| 5,269,145 A | 12/1993 | Krause et al. |
| 5,384,489 A | 1/1995 | Bellac |
| 5,537,822 A | 7/1996 | Shnaid et al. |
| 5,644,928 A | 7/1997 | Uda et al. |
| 5,653,656 A | 8/1997 | Thomas et al. |
| 5,653,670 A | 8/1997 | Endelman |
| 6,119,682 A | 9/2000 | Hazan |
| 6,318,066 B1 | 11/2001 | Skowronski |
| 6,532,745 B1 | 3/2003 | Neary |
| 6,629,413 B1 | 10/2003 | Wendt et al. |
| 6,634,410 B1 | 10/2003 | Wilson et al. |
| 6,644,062 B1 | 11/2003 | Hays |
| 6,701,711 B1 | 3/2004 | Litwin |
| 6,749,011 B2 | 6/2004 | Horng et al. |
| 6,787,116 B2 | 9/2004 | Williams et al. |
| 7,028,481 B1 | 4/2006 | Morrow |
| 7,086,231 B2 | 8/2006 | Pinkerton |
| 7,226,554 B2 | 6/2007 | Sudo et al. |
| 7,299,633 B2 | 11/2007 | Murphy et al. |
| 7,458,418 B2 | 12/2008 | Sienel |
| 7,603,858 B2 | 10/2009 | Bennett |
| 7,900,450 B2 | 3/2011 | Gurin |
| 7,937,930 B1 | 5/2011 | Dunn |
| 7,954,320 B2 | 6/2011 | Ellensohn et al. |
| 7,954,321 B2 | 6/2011 | Shinnar |
| 8,099,198 B2 | 1/2012 | Gurin |
| 8,113,011 B2 | 2/2012 | Howes et al. |
| 8,136,358 B1 | 3/2012 | Brostmeyer |
| 8,206,075 B2 | 6/2012 | White et al. |
| 8,281,593 B2 | 10/2012 | Held et al. |
| 8,378,280 B2 | 2/2013 | Mills et al. |
| 8,403,613 B2 | 3/2013 | Van Der Meulen |
| 8,424,284 B2 | 4/2013 | Staffend et al. |
| 8,453,677 B2 | 6/2013 | Howes et al. |
| 8,496,026 B2 | 7/2013 | Howes et al. |
| 8,500,388 B2 | 8/2013 | Van Der Meulen et al. |
| 8,613,195 B2 | 12/2013 | Held et al. |
| 8,616,323 B1 | 12/2013 | Gurin |
| 8,656,712 B2 | 2/2014 | Howes et al. |
| 8,671,686 B2 | 3/2014 | Pinkerton et al. |
| 8,783,034 B2 | 7/2014 | Held |
| 8,813,497 B2 | 8/2014 | Hart et al. |
| 8,826,664 B2 | 9/2014 | Howes et al. |
| 8,833,079 B2 | 9/2014 | Smith |
| 8,833,101 B2 | 9/2014 | Howes et al. |
| 8,857,186 B2 | 10/2014 | Held |
| 8,863,641 B2 | 10/2014 | Howes |
| 8,869,531 B2 | 10/2014 | Held |
| 8,904,793 B2 | 12/2014 | Hemrle et al. |
| 8,931,277 B2 | 1/2015 | Peterson et al. |
| 8,991,183 B2 | 3/2015 | Stiesdal |
| 9,003,763 B2 | 4/2015 | Coney |
| 9,014,791 B2 | 4/2015 | Held |
| 9,062,898 B2 | 6/2015 | Held et al. |
| 9,243,566 B2 | 1/2016 | Ono et al. |
| 9,316,121 B2 | 4/2016 | Davidson et al. |
| 9,316,404 B2 | 4/2016 | Gurin |
| 9,341,084 B2 | 5/2016 | Xie et al. |
| 9,394,807 B1 | 7/2016 | Kreuger |
| 9,410,449 B2 | 8/2016 | Held et al. |
| 9,441,504 B2 | 9/2016 | Held |
| 9,458,738 B2 | 10/2016 | Held et al. |
| 9,464,847 B2 * | 10/2016 | Maurer ............... F28D 7/1669 |
| 9,518,786 B2 | 12/2016 | Howes et al. |
| 9,540,957 B2 * | 1/2017 | Shinnar ............... F01K 23/10 |
| 9,605,661 B2 | 3/2017 | Aga et al. |
| 9,638,065 B2 | 5/2017 | Vermeersch et al. |
| 9,658,004 B2 | 5/2017 | Howes et al. |
| 9,683,788 B2 | 6/2017 | Olcese |
| 9,752,460 B2 | 9/2017 | Bowan |
| 9,759,096 B2 | 9/2017 | Vermeersch |
| 9,841,243 B2 | 12/2017 | Oliva Llena et al. |
| 9,863,282 B2 | 1/2018 | Hart et al. |
| 9,863,287 B2 | 1/2018 | Kacludis et al. |
| 9,874,112 B2 | 1/2018 | Giegel |
| 9,932,830 B2 | 4/2018 | Laughlin |
| 10,012,448 B2 | 7/2018 | Laughlin et al. |
| 10,024,198 B2 | 7/2018 | Held et al. |
| 10,077,683 B2 | 9/2018 | Close |
| 10,082,045 B2 | 9/2018 | Larochelle et al. |
| 10,082,104 B2 | 9/2018 | Apte |
| 10,094,219 B2 | 10/2018 | Laughlin |
| 10,221,775 B2 | 3/2019 | Apte et al. |
| 10,233,787 B2 | 3/2019 | Larochelle et al. |
| 10,233,833 B2 | 3/2019 | Apte et al. |
| 10,260,820 B2 | 4/2019 | Kerth et al. |
| 10,267,184 B2 | 4/2019 | Bowan et al. |
| 10,288,357 B2 | 5/2019 | Laughlin et al. |
| 10,294,824 B2 * | 5/2019 | Sanz .................. F28D 20/02 |
| 10,436,109 B2 | 10/2019 | Apte et al. |
| 10,443,452 B2 | 10/2019 | Laughlin et al. |
| 10,458,721 B2 | 10/2019 | Laughlin et al. |
| 10,472,994 B2 | 11/2019 | Avadhanula et al. |

(56) References Cited

U.S. PATENT DOCUMENTS

| | | |
|---|---|---|
| 10,724,805 B2 | 7/2020 | Barmeier et al. |
| 10,794,277 B2 | 10/2020 | Wagner et al. |
| 10,801,404 B2 | 10/2020 | Apte et al. |
| 10,895,409 B2 | 1/2021 | Wagner et al. |
| 10,907,510 B2 | 2/2021 | Larochelle et al. |
| 10,907,513 B2 | 2/2021 | Laughlin |
| 10,907,548 B2 | 2/2021 | Apte et al. |
| 10,920,667 B2 | 2/2021 | Apte et al. |
| 10,920,674 B2 | 2/2021 | Apte et al. |
| 10,934,895 B2 | 3/2021 | Held et al. |
| 11,053,847 B2 | 7/2021 | Apte et al. |
| 11,156,385 B2 | 10/2021 | Laughlin et al. |
| 11,187,112 B2 | 11/2021 | Held |
| 11,286,804 B2 | 3/2022 | Truong |
| 11,293,309 B2 | 4/2022 | Bowan |
| 11,371,442 B2 | 6/2022 | Apte et al. |
| 11,396,826 B2 | 7/2022 | Bollinger et al. |
| 11,454,167 B1 | 9/2022 | Bollinger et al. |
| 11,454,168 B2 | 9/2022 | Apte et al. |
| 11,480,067 B2 | 10/2022 | Truong |
| 11,486,305 B2 | 11/2022 | Bollinger et al. |
| 11,512,613 B2 | 11/2022 | Larochelle et al. |
| 11,578,650 B2 | 2/2023 | Bollinger et al. |
| 11,754,319 B2 | 9/2023 | Laughlin et al. |
| 11,761,336 B2 | 9/2023 | Laughlin |
| 2001/0054449 A1 | 12/2001 | Jones et al. |
| 2003/0074900 A1 | 4/2003 | Mcfarland |
| 2003/0131623 A1 | 7/2003 | Suppes |
| 2004/0008010 A1 | 1/2004 | Ebrahim et al. |
| 2004/0042579 A1 | 3/2004 | Bolton et al. |
| 2004/0083731 A1 | 5/2004 | Lasker |
| 2004/0088980 A1 | 5/2004 | Emmel et al. |
| 2004/0099994 A1 | 5/2004 | Brinkhues |
| 2004/0105522 A1 | 6/2004 | Kriel et al. |
| 2004/0148934 A1 | 8/2004 | Pinkerton et al. |
| 2004/0221603 A1 | 11/2004 | Arik et al. |
| 2005/0056001 A1 | 3/2005 | Frutschi et al. |
| 2005/0126171 A1 | 6/2005 | Lasker |
| 2005/0235625 A1 | 10/2005 | Gericke et al. |
| 2006/0053792 A1 | 3/2006 | Bourgeois |
| 2006/0137869 A1 | 6/2006 | Steinhauser |
| 2006/0140747 A1 | 6/2006 | Vandervort et al. |
| 2006/0185626 A1 | 8/2006 | Allen et al. |
| 2006/0248886 A1 | 11/2006 | Ma |
| 2007/0220889 A1 | 9/2007 | Nayef et al. |
| 2007/0295673 A1 | 12/2007 | Enis et al. |
| 2008/0022683 A1 | 1/2008 | Ohler et al. |
| 2008/0066736 A1 | 3/2008 | Zhu |
| 2008/0121387 A1 | 5/2008 | Taniguchi et al. |
| 2008/0178601 A1 | 7/2008 | Nakhamkin |
| 2008/0272597 A1 | 11/2008 | Althaus |
| 2009/0126377 A1 | 5/2009 | Shibata et al. |
| 2009/0178409 A1* | 7/2009 | Shinnar ............... F28D 17/005 60/659 |
| 2009/0179429 A1 | 7/2009 | Ellis et al. |
| 2009/0293502 A1 | 12/2009 | Vandor |
| 2010/0024421 A1 | 2/2010 | Litwin et al. |
| 2010/0083660 A1 | 4/2010 | Nakhamkin |
| 2010/0175365 A1 | 7/2010 | Ota |
| 2010/0176602 A1* | 7/2010 | Shinnar ............... F03G 6/04 290/1 A |
| 2010/0199694 A1 | 8/2010 | Taras et al. |
| 2010/0202582 A1 | 8/2010 | Shinnar et al. |
| 2010/0218500 A1 | 9/2010 | Ruer |
| 2010/0251712 A1 | 10/2010 | Nakhamkin |
| 2010/0275616 A1 | 11/2010 | Saji et al. |
| 2010/0301062 A1 | 12/2010 | Litwin et al. |
| 2010/0301614 A1 | 12/2010 | Ruer |
| 2010/0305516 A1 | 12/2010 | Xu et al. |
| 2011/0036091 A1 | 2/2011 | Waterstripe et al. |
| 2011/0081252 A1 | 4/2011 | Li |
| 2011/0100010 A1 | 5/2011 | Freund et al. |
| 2011/0100011 A1 | 5/2011 | Staffend |
| 2011/0100213 A1 | 5/2011 | Finkenrath et al. |
| 2011/0100356 A1 | 5/2011 | Bliesner |
| 2011/0100611 A1 | 5/2011 | Ohler et al. |
| 2011/0120669 A1 | 5/2011 | Hunt |
| 2011/0126539 A1 | 6/2011 | Ramaswamy et al. |
| 2011/0139407 A1 | 6/2011 | Ohler et al. |
| 2011/0146940 A1 | 6/2011 | Golbs et al. |
| 2011/0204655 A1 | 8/2011 | Waibel |
| 2011/0209496 A1 | 9/2011 | Horlyk et al. |
| 2011/0226440 A1 | 9/2011 | Bissell et al. |
| 2011/0259007 A1 | 10/2011 | Aoyama et al. |
| 2011/0262269 A1 | 10/2011 | Lior |
| 2011/0277471 A1 | 11/2011 | Shinnar |
| 2011/0283700 A1 | 11/2011 | Zohar et al. |
| 2011/0289941 A1 | 12/2011 | Gonzalez Salazar et al. |
| 2011/0314839 A1 | 12/2011 | Brook et al. |
| 2012/0017622 A1 | 1/2012 | Kondo et al. |
| 2012/0039701 A1 | 2/2012 | Diddi et al. |
| 2012/0055661 A1 | 3/2012 | Feher |
| 2012/0060501 A1 | 3/2012 | Hemrle et al. |
| 2012/0067047 A1* | 3/2012 | Peterson ............... F28D 20/02 60/659 |
| 2012/0080161 A1 | 4/2012 | Kelly |
| 2012/0137684 A1 | 6/2012 | Yogev et al. |
| 2012/0222423 A1 | 9/2012 | Mercangoez et al. |
| 2012/0267955 A1 | 10/2012 | Zhan et al. |
| 2012/0308364 A1 | 12/2012 | Hofmann |
| 2012/0319410 A1 | 12/2012 | Ambrosek et al. |
| 2013/0033044 A1 | 2/2013 | Wright et al. |
| 2013/0081394 A1 | 4/2013 | Perry |
| 2013/0087301 A1 | 4/2013 | Hemrle et al. |
| 2013/0105127 A1 | 5/2013 | Postma et al. |
| 2013/0111904 A1* | 5/2013 | Stiesdal ............... F28D 17/04 165/104.31 |
| 2013/0118170 A1 | 5/2013 | Mierisch et al. |
| 2013/0118344 A1 | 5/2013 | Howes et al. |
| 2013/0125546 A1 | 5/2013 | Barmeier et al. |
| 2013/0147197 A1 | 6/2013 | Goebel et al. |
| 2013/0192216 A1 | 8/2013 | Berlin, Jr. et al. |
| 2013/0197704 A1 | 8/2013 | Pan et al. |
| 2013/0257056 A1 | 10/2013 | Ma |
| 2013/0266424 A1 | 10/2013 | Soehner |
| 2013/0276917 A1 | 10/2013 | Howes et al. |
| 2013/0318969 A1 | 12/2013 | Zhou et al. |
| 2013/0340432 A1 | 12/2013 | Hunt et al. |
| 2014/0008033 A1 | 1/2014 | Howes et al. |
| 2014/0014302 A1 | 1/2014 | Gutai |
| 2014/0060051 A1 | 3/2014 | Ohler et al. |
| 2014/0075970 A1 | 3/2014 | Benson |
| 2014/0103661 A1 | 4/2014 | Kacludis et al. |
| 2014/0165572 A1 | 6/2014 | Pang et al. |
| 2014/0190659 A1 | 7/2014 | Laurberg |
| 2014/0202157 A1 | 7/2014 | Shinnar et al. |
| 2014/0224447 A1 | 8/2014 | Reznik et al. |
| 2014/0224469 A1 | 8/2014 | Mirmobin et al. |
| 2014/0230401 A1 | 8/2014 | Dunn |
| 2014/0284021 A1 | 9/2014 | Laurberg et al. |
| 2014/0352295 A1 | 12/2014 | Reznik et al. |
| 2014/0352304 A1 | 12/2014 | Arias et al. |
| 2015/0026046 A1 | 1/2015 | Postrel |
| 2015/0034188 A1 | 2/2015 | Howes |
| 2015/0069758 A1 | 3/2015 | Davidson et al. |
| 2015/0084567 A1 | 3/2015 | Howes |
| 2015/0113806 A1 | 4/2015 | Couturier et al. |
| 2015/0113940 A1 | 4/2015 | Sinatov et al. |
| 2015/0114217 A1 | 4/2015 | Howes |
| 2015/0114591 A1 | 4/2015 | Howes et al. |
| 2015/0136115 A1 | 5/2015 | Bruch et al. |
| 2015/0167648 A1 | 6/2015 | Bergan |
| 2015/0211386 A1 | 7/2015 | Howes et al. |
| 2015/0260463 A1* | 9/2015 | Laughlin ............... F24S 60/10 165/104.31 |
| 2015/0267612 A1 | 9/2015 | Bannari |
| 2015/0318810 A1 | 11/2015 | Hirao et al. |
| 2015/0361832 A1 | 12/2015 | Franke et al. |
| 2015/0372538 A1 | 12/2015 | Siegler et al. |
| 2016/0011617 A1 | 1/2016 | Liu et al. |
| 2016/0018134 A1 | 1/2016 | Ueda et al. |
| 2016/0030856 A1 | 2/2016 | Kaplan et al. |
| 2016/0032783 A1 | 2/2016 | Howes et al. |
| 2016/0047361 A1 | 2/2016 | Al-Sulaiman |

(56) References Cited

U.S. PATENT DOCUMENTS

| | | |
|---|---|---|
| 2016/0222830 A1 | 8/2016 | Aga et al. |
| 2016/0248299 A1 | 8/2016 | Ouvry |
| 2016/0290281 A1 | 10/2016 | Schmalz |
| 2016/0298498 A1 | 10/2016 | Kreuger |
| 2017/0081980 A1 | 3/2017 | Davidson et al. |
| 2017/0159496 A1 | 6/2017 | Laughlin et al. |
| 2017/0159497 A1 | 6/2017 | Laughlin et al. |
| 2017/0159498 A1 | 6/2017 | Laughlin et al. |
| 2017/0159500 A1 | 6/2017 | Laughlin et al. |
| 2017/0226900 A1* | 8/2017 | Sanz ............ F02C 6/16 |
| 2017/0254229 A1 | 9/2017 | Fletcher |
| 2017/0292450 A1 | 10/2017 | Kutnjak et al. |
| 2018/0142577 A1 | 5/2018 | Ortmann et al. |
| 2018/0179917 A1 | 6/2018 | Apte et al. |
| 2018/0180363 A1 | 6/2018 | Apte et al. |
| 2018/0185942 A1 | 7/2018 | Apte et al. |
| 2018/0187572 A1 | 7/2018 | Apte |
| 2018/0245485 A1 | 8/2018 | Conlon |
| 2018/0340712 A1 | 11/2018 | Peter et al. |
| 2019/0030593 A1 | 1/2019 | Merrill et al. |
| 2019/0162482 A1 | 5/2019 | Kerth |
| 2019/0195131 A1 | 6/2019 | Zia et al. |
| 2019/0212070 A1 | 7/2019 | Laughlin et al. |
| 2019/0277196 A1 | 9/2019 | Ortmann et al. |
| 2020/0248592 A1 | 8/2020 | Lehar et al. |
| 2021/0180522 A1 | 6/2021 | Apte et al. |
| 2021/0293406 A1 | 9/2021 | De Miranda Carvalho |
| 2021/0324765 A1 | 10/2021 | Conlon |
| 2021/0332752 A1 | 10/2021 | Williams |
| 2023/0073676 A1 | 3/2023 | Apte et al. |

FOREIGN PATENT DOCUMENTS

| | | |
|---|---|---|
| CA | 2952379 C | 4/2019 |
| CA | 2923403 C | 8/2022 |
| CN | 1359447 A | 7/2002 |
| CN | 1847626 A | 10/2006 |
| CN | 101169067 A | 4/2008 |
| CN | 101720380 A | 6/2010 |
| CN | 102374026 A | 3/2012 |
| CN | 203532124 U | 4/2014 |
| CN | 104297072 A | 1/2015 |
| CN | 204572095 U | 8/2015 |
| CN | 104884768 A | 9/2015 |
| CN | 104903551 A | 9/2015 |
| CN | 104956059 A | 9/2015 |
| CN | 106224040 A | 12/2016 |
| CN | 106224041 A | 12/2016 |
| CN | 207513700 U | 6/2018 |
| CN | 110573699 A | 12/2019 |
| CN | 111677640 A | 9/2020 |
| CN | 113390074 A | 9/2021 |
| DE | 567451 C | 1/1933 |
| DE | 2904232 A1 | 12/1980 |
| DE | 2928691 A1 | 2/1981 |
| DE | 3118101 A1 | 2/1983 |
| DE | 202013004654 U1 | 8/2014 |
| DE | 102013006814 A1 | 10/2014 |
| DE | 102014117659 A1 | 9/2016 |
| EP | 0003980 A1 | 9/1979 |
| EP | 1577548 A1 | 9/2005 |
| EP | 1857614 A2 | 11/2007 |
| EP | 2241737 A1 | 10/2010 |
| EP | 2275649 A1 | 1/2011 |
| EP | 2312129 A1 | 4/2011 |
| EP | 2390473 A1 | 11/2011 |
| EP | 2400120 A1 | 12/2011 |
| EP | 2441925 A1 | 4/2012 |
| EP | 2441926 A1 | 4/2012 |
| EP | 2530283 A1 | 12/2012 |
| EP | 2532843 A1 | 12/2012 |
| EP | 2574740 A1 | 4/2013 |
| EP | 2602443 A1 | 6/2013 |
| EP | 2778406 A1 * | 9/2014 ............ F01K 3/00 |
| EP | 2940406 A1 | 11/2015 |
| EP | 2446122 B1 | 8/2017 |
| EP | 2905432 B1 | 4/2018 |
| EP | 3444448 A1 | 2/2019 |
| EP | 3563050 A2 | 11/2019 |
| GB | 2501683 A | 11/2013 |
| GB | 2501685 A | 11/2013 |
| GB | 2501795 A | 11/2013 |
| GB | 2528757 A | 2/2016 |
| JP | S62110499 A | 5/1987 |
| JP | H03286103 A | 12/1991 |
| JP | H0868341 A | 3/1996 |
| JP | H0893633 A | 4/1996 |
| JP | 2000154733 A | 6/2000 |
| JP | 2011106755 A | 6/2011 |
| KR | 20040045337 A | 6/2004 |
| KR | 20120042921 A | 5/2012 |
| KR | 101370843 B1 | 3/2014 |
| KR | 20150089110 A | 8/2015 |
| RU | 2012104762 A | 8/2013 |
| WO | WO-02080190 A1 | 10/2002 |
| WO | WO-2005019756 A2 | 3/2005 |
| WO | WO-2010024691 A2 | 3/2010 |
| WO | WO-2011099891 A1 | 8/2011 |
| WO | WO-2011161094 A2 | 12/2011 |
| WO | WO-2012176258 A1 | 12/2012 |
| WO | WO-2013037658 A1 | 3/2013 |
| WO | WO-2013045388 A1 | 4/2013 |
| WO | WO-2013094905 A1 | 6/2013 |
| WO | WO-2013119145 A2 | 8/2013 |
| WO | WO-2013164563 A1 | 11/2013 |
| WO | WO-2013164653 A1 | 11/2013 |
| WO | WO-2014027093 A1 | 2/2014 |
| WO | WO-2014052098 A1 | 4/2014 |
| WO | WO-2014052927 A1 | 4/2014 |
| WO | WO-2014114531 A1 | 7/2014 |
| WO | WO-2014191157 A2 | 12/2014 |
| WO | WO-2015019096 A1 | 2/2015 |
| WO | WO-2015185891 A1 | 12/2015 |
| WO | WO-2016000016 A1 | 1/2016 |
| WO | WO-2016165932 A1 | 10/2016 |
| WO | WO-2018001931 A1 | 1/2018 |
| WO | WO-2018125511 A2 | 7/2018 |
| WO | WO-2018125535 A1 | 7/2018 |
| WO | WO-2019034536 A1 | 2/2019 |
| WO | WO-2020131194 A1 | 6/2020 |
| WO | WO-2021097413 A1 | 5/2021 |
| WO | WO-2021158641 A1 | 8/2021 |

OTHER PUBLICATIONS

Al-Attab et al., "Externally Fired Gas Turbine Technology: A Review," Applied Energy, 2015, pp. 474-487, vol. 138.

Anheden, M., "Economic Evaluation of Externally Fired Gas Turbine Cycles for Small-Scale Biomass Cogeneration," Technical Report, Jan. 2001, 112 pages.

Bammert et al., "Layout and Present Status of the Closed-Cycle Helium Turbine Plant Oberhausen," ASME 1974 International Gas Turbine Conference and Products Show, 1974, 9 pages.

Bammert et al., "Operation and Control of the 50-Mw Closed-Cycle Helium Turbine Oberhausen," ASME 1974 International Gas Turbine Conference and Products Show, Mar. 1974, 8 pages.

Bammert et al., "Status Report on Closed-Cycle Power Plants in the Federal Republic of Germany," Journal of Engineering for Power, Jan. 1977, pp. 37-46, vol. 99, No. 1.

Bammert et al., "Twenty-Five Years of Operating Experience With the Coal-Fired, Closed-Cycle Gas Turbine Cogeneration Plant at Coburg," Journal of Engineering for Power, Oct. 1983, 10 pages, vol. 105.

Baofix, Historical Review of Closed Cycle Gas Turbine (CCGT) Power Plants, Malta, 20 Pages.

Bardia, Alexander, "Dynamics and Control Modeling of the Closed-cycle Gas Turbine (Gt-HTGR) Power Plant," Fourth Power Plant Dynamics, Control and Testing Symposium, General Atomic Company, Feb. 1980, 35 pages.

Bauer et al., "Sodium Nitrate for High Temperature Latent Heat Storage," The 11th International Conference on Thermal Energy Storage-Effstock, Jun. 2009, 8 pages.

(56) References Cited

OTHER PUBLICATIONS

Böke, Erhan, "Comparison of Thermal Efficiency of the Closed-Cycle Gas Turbine with and without Regeneration," The Second Scientific Technical Seminar on Gas Turbine Engine, Nov. 1996, 9 pages.
Boyce, Meherwan P., "7-Axial-Flow Compressors," Gas Turbine Engineering Handbook (Fourth Edition), 2012, pp. 303-355.
Boyce, Meherwan P., "Axial-Flow compressors", 2003 (date estimated), Internet, 33 pages.
Bradshaw et al., "Molten Nitrate Salt Development for Thermal Energy Storage in Parabolic Trough Solar Power Systems," ASME 2008 2nd International Conference on Energy Sustainability, ES2008-54174, 2008, pp. 631-637, vol. 2.
Chinese Patent Application No. 201780086973.3, Office Action dated Dec. 17, 2021—English Translation Available.
Chinese Patent Application No. 201780086973.3, Office Action dated Sep. 19, 2022—English Translation Available.
Coco-Enriquez et al., "New Text Comparison Between Co2 and Other Supercritical Working Fluids (Ethane, Xe, Ch4 And N2) in Line-Focusing Solar Power Plants Coupled To Supercritical Brayton Power Cycles," International Journal of Hydrogen Energy, Mar. 2017, vol. 42 (28), pp. 17611-17631.
Crotogino et al., "Huntorf CAES: More than 20 Years of Successful Operation," Spring Meeting, Apr. 2001, 7 pages.
Desrues et al., "A Thermal Energy Storage Process for Large Scale Electric Applications," Applied Thermal Engineering, Apr. 2010, pp. 425-432, vol. 30, No. 5.
Deuster et al., "Long-Time Operating Experiences with Oberhausen Closed-Cycle Gas-Turbine Plant," ASME 1970 International Gas Turbine Conference and Products Show, Jan. 1970, 15 pages.
Dewing Ernest W., "Heat Capacities of Liquid Sodium and Potassium Nitrates," Journal of Chemical and Engineering, 1975, pp. 221-223, vol. 20, No. 3.
Diguilio, R.M. et al., "The Thermal Conductivity of the Molten NaN03-KN03 Eutectic Between 525 and 590 K," International Journal of Thermophysics, Jul. 1992, pp. 575-592, vol. 13, No. 4.
Eisenberg, B., "Development of a New Front Stage for an Industrial Axial Flow Compressor," The American Society of Mechanical Engineers, Feb. 2015, 9 pages, Paper No. 93-GT-327.
European Patent Application No. 17885998.9, Extended European Search Report dated Jul. 13, 2020.
European Patent Application No. 17886005.2, Extended European Search Report dated Jul. 22, 2020.
European Patent Application No. 17886168.8, Extended European Search Report dated Oct. 19, 2020.
European Patent Application No. 17886168.8, Partial Supplementary European Search Report dated Jul. 15, 2020.
European Patent Application No. 17886274.4, Extended European Search Report dated Oct. 19, 2020.
European Patent Application No. 17886274.4, Partial Supplementary European Search Report dated Jul. 15, 2020.
European Patent Application No. 17887008.5, Extended European Search Report dated Jul. 20, 2020.
European Patent Application No. 17887541.5, Extended European Search Report dated Feb. 3, 2021.
Farres-Antunez et al., "A Pumped Thermal Energy Storage Cycle With Capacity for Concentrated Solar Power Integration," Offshore Energy and Storage Summit (OSES) IEEE, Jul. 2019, pp. 1-10.
Final Office Action mailed on Jun. 12, 2019 for U.S. Appl. No. 15/392,927, filed Dec. 28, 2016, 42 pages.
Final Office Action mailed on Jun. 25, 2020, for U.S. Appl. No. 16/289,017, filed Feb. 28, 2019, 22 pages.
Final Office Action mailed on Jun. 25, 2020, for U.S. Appl. No. 16/354,824, filed Mar. 15, 2019, 21 pages.
Final Office Action mailed on Apr. 28, 2020 for U.S. Appl. No. 15/392,542, filed Dec. 28, 2016, 27 pages.
Final Office Action mailed on Aug. 1, 2017, for U.S. Appl. No. 13/965,048, filed Aug. 12, 2013, 16 pages.
Final Office Action mailed on Apr. 2, 2019, for U.S. Appl. No. 15/440,312, filed Feb. 23, 2017, 13 pages.
Final Office Action mailed on Jun. 6, 2018 for U.S. Appl. No. 15/396,461, filed Dec. 31, 2016, 10 pages.
Final Office Action mailed on Nov. 6, 2015, for U.S. Appl. No. 12/932,775, filed Mar. 4, 2011, 15 pages.
Final Office Action mailed on Apr. 8, 2020 for U.S. Appl. No. 15/395,622, filed Dec. 30, 2016, 26 pages.
Final Office Action mailed on Jan. 9, 2014 for U.S. Appl. No. 12/932,775, filed Mar. 4, 2011, 11 pages.
Final Office Action mailed on Jan. 10, 2022 for U.S. Appl. No. 16/779,975, filed Mar. 2, 2020, 24 pages.
Final Office Action mailed on Apr. 12, 2022 for U.S. Appl. No. 17/092,806, filed Nov. 9, 2020, 16 pages.
Final Office Action mailed on Jan. 12, 2023 for U.S. Appl. No. 17/400,953, filed Aug. 12, 2021, 17 pages.
Final Office Action mailed on Feb. 13, 2023 for U.S. Appl. No. 16/779,975, filed Feb. 3, 2020, 25 pages.
Final Office Action mailed on Sep. 14, 2022 for U.S. Appl. No. 17/164,302, filed Feb. 1, 2021, 12 pages.
Final Office Action mailed on Feb. 19, 2019 for U.S. Appl. No. 15/440,289, filed Feb. 23, 2017, 10 pages.
Final Office Action mailed on Feb. 21, 2019 for U.S. Appl. No. 15/440,297, filed Feb. 23, 2017, 11 pages.
Final Office Action mailed on Aug. 22, 2016, for U.S. Appl. No. 13/965,048, filed Aug. 12, 2013, 13 pages.
Final Office Action mailed on Jan. 24, 2022 for U.S. Appl. No. 17/164,295, filed Feb. 1, 2021, 7 pages.
Final Office Action mailed on Jul. 25, 2017 for U.S. Appl. No. 12/932,775, filed Mar. 4, 2011, 19 pages.
Final Office Action mailed on Sep. 25, 2017, for U.S. Appl. No. 14/668,610, filed Mar. 25, 2015, 28 pages.
Final Office Action mailed on Oct. 28, 2022 for U.S. Appl. No. 17/400,706, filed Aug. 12, 2021, 17 pages.
Fraas et al., "Summary of Research and Development Effort on Closed-cycle Gas Turbines," Engineering Technology Division, Jun. 1981, 39 pages.
Früchtel et al., "Development of the GT36 Sequential Combustor," Ansaldo Energio, 2017, 18 pages.
Freeman, Eli S., "The Kinetics of the Thermal Decomposition of Sodium Nitrate and of the Reaction Between Sodium Nitrate and Oxygen," The Journal of Physical Chemistry, Nov. 1956, pp. 1487-1493, vol. 60, No. 11.
Frutschi, Hans Ulrich, "Closed-Cycle Gas Turbines," New York, ASME, 2005, Jan. 29, 2016, 293 pages. Retrieved from the internet: [URL: http://ebooks.asmedigitalcollection.asme.org/books.aspx].
Gamannossi et al., "Analysis of the GT26 Single Shaft Gas Turbine Performance and Emissions," Energy Procedia, Sep. 2017, pp. 461-468, vol. 126.
Hansen, Curt, "Land Based Gas Turbines for Power Production," ASEN 5063, Dec. 2009, 18 pages.
Ho et al., "Cost and Performance Tradeoffs of Alternative Solar Driven S-C02 Brayton Cycle Configuration," Proceedings of the ASME 2015 Power and Energy Conversion Conference, Jul. 2015, 10 pages.
International Preliminary Report on Patentability for Application No. PCT/US2013/062469, mailed on Mar. 31, 2015, 9 pages.
International Search Report and Written Opinion of PCT Application No. PCT/US2013/062469, mailed on Jan. 2, 2014, 11 pages.
International Search Report and Written Opinion of PCT Application No. PCT/US2017/062117, mailed on Feb. 22, 2018, 17 pages.
International Search Report and Written Opinion of PCT Application No. PCT/US2017/063289, mailed on Apr. 16, 2018, 17 pages.
International Search Report and Written Opinion of PCT Application No. PCT/US2017/063519, mailed on Apr. 12, 2018, 16 pages.
International Search Report and Written Opinion of PCT Application No. PCT/US2017/063521, mailed on Mar. 12, 2018, 18 pages.
International Search Report and Written Opinion of PCT Application No. PCT/US2017/064074, mailed on Feb. 26, 2018, 13 pages.
International Search Report and Written Opinion of PCT Application No. PCT/US2017/064076, mailed on Jul. 30, 2018, 15 pages.
International Search Report and Written Opinion of PCT Application No. PCT/US2017/064839, mailed on Mar. 20, 2018, 13 pages.
International Search Report and Written Opinion of PCT Application No. PCT/US2017/065200, mailed on Mar. 26, 2018, 15 pages.

(56) References Cited

OTHER PUBLICATIONS

International Search Report and Written Opinion of PCT Application No. PCT/US2017/065201, mailed on Mar. 27, 2018, 13 pages.
International Search Report and Written Opinion of PCT Application No. PCT/US2017/065643, mailed on Mar. 29, 2018, 17 pages.
International Search Report and Written Opinion of PCT Application No. PCT/US2017/065645, mailed on Mar. 26, 2018, 16 pages.
International Search Report and Written Opinion of PCT Application No. PCT/US2017/067049, mailed on Mar. 29, 2018, 16 pages.
International Search Report and Written Opinion of PCT Application No. PCT/US2020/060700, mailed on Mar. 29, 2021, 18 pages.
International Search Report and Written Opinion of PCT Application No. PCT/US2021/016382, mailed on Apr. 13, 2021, 49 pages.
International Search Report and Written Opinion of PCT Application No. PCT/US2021/016384, mailed on Apr. 12, 2021, 17 pages.
International Search Report and Written Opinion of PCT Application No. PCT/US2021/045640, mailed on Dec. 23, 2021 99 pages.
International Search Report and Written Opinion of PCT Application No. PCT/US2021/045642, mailed on Dec. 23, 2021 121 pages.
International Search Report and Written Opinion of PCT Application No. PCT/US2021/045654, mailed on Dec. 14, 2021, 219 pages.
International Search Report and Written Opinion of PCT Application No. PCT/US2021/045655, mailed on Dec. 13, 2021 129 pages.
International Search Report and Written Opinion of PCT Application No. PCT/US2021/045659, mailed on Nov. 5, 2021, 161 pages.
International Search Report and Written Opinion of PCT Application No. PCT/US2021/045738, mailed on Dec. 13, 2021 232 pages.
International Search Report and Written Opinion of PCT Application No. PCT/US2021/045746, mailed on Dec. 13, 2021 127 pages.
International Search Report and Written Opinion of PCT Application No. PCT/US2021/045759, mailed on Dec. 21, 2021, 14 pages.
International Search Report and Written Opinion of PCT Application No. PCT/US2021/045778, mailed on Dec. 20, 2021 48 pages.
Isentropic, "A New Era in Electrical Energy Storage and Recovery," 2014, 2 pages. Retrieved from the internet: [URL: http://www.isenlropic.co.uk/our-phesechnology].
John, "Stem and CPower to Combine Behind-the-Meter Batteries and Demand Response," Energy Storage, Aug. 8, 2017, 1 page.
Jose et al., "A Novel Supercritical C02 Recompression Brayton Power Cycle for Power Tower Concentrating Solar Plants," Applied Energy, Feb. 2020, vol. 263, pp. 22.
Keller et al., "Industrial Closed-Cycle Gas Turbines for Conventional and Nuclear Fuel," ASME 1967 Gas Turbine Conference and Products Show, 1967, 14 pages.
Keller et al., "Operating Experience and Design Features of Closed Cycle Gas Turbine Power Plants," The American Society of Mechanical Engineers (ASME) 1956 Gas Turbine Power Conference, Apr. 1956, 52 pages.
Keller et al., "The Aerodynamic Turbine in the Iron and Steel Works," Swiss Construction Newspaper, 1943, 7 pages, vol. 121/122.
Keller et al., "The Coal-Burning Closed-Cycle Gas Turbine," ASME 1961 Gas Turbine Power Conference and Exhibit, 1961, 7 pages.
Keller, Curt, "Forty Years of Experience on Closed-Cycle Gas Turbines," Annals of Molecular Biology, Jun. 1978, pp. 405-422, vol. 5.
Kuo et al., "Closed Cycle Gas Turbine Systems in Europe," United Technology Research Center, Office of Naval Research, Mar. 1977, 24 pages.
Kuo et al., "The Prospects for Solar-Powered Closed-Cycle Gas Turbines," The American Society of Mechanical Engineers, Mar. 1980, 9 pages.
Kupiec, Hailey, "Chamfer or Fillet: It's More than a Coin Toss," 2016, Engineering.com, 3 pages, Retrieved from the internet: URL:https://www.engineering.com/AdvancedManufacturing/ArticleID/12682/Chamfer-or-Fillet-Its-More-Than-a-Coin-Toss.aspx.
La Fleur et al., "The Closed-Cycle Gas Turbine and Cryogenics: A New Application," ASME 1965 Gas Turbine Conference and Products Show, 1965, 5 pages.

La Fleur, James K., "Description of an Operating Closed Cycle—Helium Gas Turbine," The American Society of Mechanical Engineers, 1963, 8 pages, Paper No. 63-AGHT-74.
Laughlin et al., U.S. Appl. No. 61/706,337, filed Sep. 27, 2012, 34 pages.
Laughlin et al., U.S. Appl. No. 61/868,070, filed Aug. 20, 2013, 45 pages.
Laughlin, R.B., "Here Comes the Sun," Stanford Physics Department Colloquium, Jan. 2010, 23 pages.
Laughlin R.B., U.S. Appl. No. 61/339,577, filed Mar. 4, 2010, 18 pages.
Macnaghten, James, "Commercial Potential of Different Large Scale Thermal Storage Technologies Under Development Globally," Isentropic LTD, Jun. 2016, 21 pages.
Man Turbo, Engineering the Future, Since 1758, Apr. 2009, 40 pages.
McDonald et al., "Helium and Combustion Gas Turbine Power Conversion Systems Comparison," ASME 1995 International Gas Turbine and Aeroengine Congress and Exposition, Jun. 1995, 12 pages.
McDonald et al., "Helium Turbomachinery Operating Experience From Gas Turbine Power Plants and Test Facilities," Applied Thermal Engineering, 2012, pp. 108-142, vol. 44.
McDonald et al., "Closed-Cycle Gas Turbine Applications for Fusion Reactors," The American Society of Mechanical Engineers, Dec. 1981, pp. 1-18, vol. 13, No. 1.
Morimoto et al., "The 2000kw Gas Turbine Plant," Mechanical Div., Engineering Department, 1956, pp. 63-68, vol. 2, No. 3.
Morimoto et al., "The First Closed-Cycle Gas Turbine Power Plant In Japan," Thermal Machine Div., Design Dep't., 1958, pp. 57-64, vol. 4, No. 3.
Morimoto, Takaoki, "12.000 KW Gas Turbine Power Generating Unit for Steel Works," Fuji Denki Review, 1960, pp. 93-101, vol. 8, No. 4.
Non-Final Office Action mailed on Nov. 13, 2019, for U.S. Appl. No. 15/392,542, filed Dec. 28, 2016, 13 pages.
Non-Final Office Action mailed on Jun. 9, 2020 for U.S. Appl. No. 15/392,542, filed Dec. 28, 2016, 17 pages.
Non-Final Office Action mailed Jun. 3, 2022 on for U.S. Appl. No. 17/365,341, filed Jul. 1, 2021, 12 pages.
Non-Final Office Action mailed Nov. 3, 2021 on for U.S. Appl. No. 17/092,806, filed Nov. 9, 2020, 12 pages.
Non-Final Office Action mailed Feb. 6, 2023 for U.S. Appl. No. 17/971,196, filed Oct. 21, 2021, 59 pages.
Non-Final Office Action mailed Sep. 9, 2021 on for U.S. Appl. No. 17/164,295, filed Feb. 1, 2021, 7 pages.
Non-Final Office Action mailed Jan. 11, 2022 for U.S. Appl. No. 17/164,302, filed Feb. 1, 2021, 8 pages.
Non-Final Office Action mailed Jul. 12, 2022 on for U.S. Appl. No. 16/779,975, filed Feb. 3, 2020, 50 pages.
Non-Final Office Action mailed Sep. 13, 2021 on for U.S. Appl. No. 16/991,802, filed Aug. 12, 2020, 61 pages.
Non-Final Office Action mailed Dec. 14, 2022 for U.S. Appl. No. 17/705,738, filed Mar. 28, 2022, 6 pages.
Non-Final Office Action mailed Feb. 17, 2023 for U.S. Appl. No. 17/952,722, filed Sep. 26, 2022, 211 pages.
Non-Final Office Action mailed May 19, 2022 for U.S. Appl. No. 17/400,706, filed Aug. 12, 2021, 16 pages.
Non-Final Office Action mailed May 20, 2022 for U.S. Appl. No. 17/400,953, filed Aug. 12, 2021, 18 pages.
Non-Final Office Action mailed Oct. 22, 2021 on for U.S. Appl. No. 17/174,490, filed Feb. 12, 2021, 10 pages.
Non-Final Office Action mailed Aug. 23, 2021 on for U.S. Appl. No. 16/991,813, filed Aug. 12, 2020, 65 pages.
Non-Final Office Action mailed Jan. 24, 2023 for U.S. Appl. No. 17/872,489, filed Jul. 25, 2022, 6 pages.
Non-Final Office Action mailed Jan. 25, 2023 for U.S. Appl. No. 17/952,753, filed Sep. 26, 2022, 10 pages.
Non-Final Office Action mailed Jul. 28, 2022 on for U.S. Appl. No. 17/509,341, filed Oct. 25, 2021, 13 pages.
Non-Final Office Action mailed Jun. 29, 2021 on for U.S. Appl. No. 16/779,975, filed Feb. 3, 2020, 14 pages.

(56) References Cited

OTHER PUBLICATIONS

Non-Final Office Action mailed Sep. 30, 2022 on for U.S. Appl. No. 17/092,806, filed Nov. 9, 2020, 14 pages.
Non-Final Office Action mailed Aug. 31, 2021 on for U.S. Appl. No. 16/991,790, filed Aug. 12, 2020, 62 pages.
Non-Final Office Action mailed on Apr. 1, 2019 for U.S. Appl. No. 15/393,891, filed Dec. 29, 2016, 13 pages.
Non-Final Office Action mailed on Nov. 1, 2018, for U.S. Appl. No. 15/440,297, filed Feb. 23, 2017, 11 pages.
Non-Final Office Action mailed on Nov. 3, 2016, for U.S. Appl. No. 12/932,775, filed Mar. 4, 2011, 17 pages.
Non-Final Office Action mailed on Dec. 4, 2015, for U.S. Appl. No. 13/965,048, filed Aug. 12, 2013, 11 pages.
Non-Final Office Action mailed on May 4, 2020, for U.S. Appl. No. 16/289,017, filed Feb. 28, 2019, 84 pages.
Non-Final Office Action mailed on May 4, 2020, for U.S. Appl. No. 16/354,824, filed Mar. 15, 2019, 83 pages.
Non-Final Office Action mailed on Aug. 5, 2021 for U.S. Appl. No. 17/069,496, filed Oct. 13, 2020, 15 pages.
Non-Final Office Action mailed on Feb. 5, 2020, for U.S. Appl. No. 16/111,151, filed Aug. 23, 2018, 9 pages.
Non-Final Office Action mailed on Feb. 8, 2018, for U.S. Appl. No. 15/396,461, filed Dec. 31, 2016, 09 pages.
Non-Final Office Action mailed on Nov. 8, 2018, for U.S. Appl. No. 15/440,300, filed Feb. 23, 2017, 26 pages.
Non-Final Office Action mailed on Jan. 9, 2019, for U.S. Appl. No. 15/396,461, filed Dec. 31, 2016, 13 pages.
Non-Final Office Action mailed on Jan. 11, 2019, for U.S. Appl. No. 15/440,312, filed Feb. 23, 2017, 14 pages.
Non-Final Office Action mailed on Apr. 13, 2020, for U.S. Appl. No. 16/260,859, filed Jan. 29, 2019, 72 pages.
Non-Final Office Action mailed on Apr. 13, 2020, for U.S. Appl. No. 16/260,932, filed Jan. 29, 2019, 71 pages.
Non-Final Office Action mailed on Feb. 13, 2018, for U.S. Appl. No. 14/668,610, filed Mar. 25, 2015, 13 pages.
Non-Final Office Action mailed on Feb. 14, 2023 for U.S. Appl. No. 17/400,706, filed Aug. 12, 2021, 14 pages.
Non-Final Office Action mailed on May 14, 2018, for U.S. Appl. No. 15/392,653, filed Dec. 28, 2016, 26 pages.
Non-Final Office Action mailed on May 14, 2018, for U.S. Appl. No. 15/392,657, filed Dec. 28, 2016, 27 pages.
Non-Final Office Action mailed on Jan. 15, 2019, for U.S. Appl. No. 15/440,295, filed Feb. 23, 2017, 22 pages.
Non-Final Office Action mailed on Nov. 15, 2018, for U.S. Appl. No. 15/440,306, filed Feb. 23, 2017, 13 pages.
Non-Final Office Action mailed on Oct. 17, 2019, for U.S. Appl. No. 15/395,622, filed Dec. 30, 2016, 14 pages.
Non-Final Office Action mailed on Dec. 23, 2022, for U.S. Appl. No. 17/850,510, filed Jun. 27, 2022, 22 pages.
Non-Final Office Action mailed on Mar. 23, 2017 for U.S. Appl. No. 13/965,048, filed Aug. 12, 2013, 20 pages.
Non-Final Office Action mailed on May 25, 2018, for U.S. Appl. No. 15/393,874, filed Dec. 29, 2016.
Non-Final Office Action mailed on Feb. 26, 2015, for U.S. Appl. No. 12/932,775, filed Mar. 4, 2011, 14 pages.
Non-Final Office Action mailed on Mar. 26, 2019 for U.S. Appl. No. 15/392,523, filed Dec. 28, 2016, 9 pages.
Non-Final Office Action mailed on Jan. 28, 2021, for U.S. Appl. No. 16/289,017, filed Feb. 28, 2019, 16 pages.
Non-Final Office Action mailed on Jun. 28, 2018, for U.S. Appl. No. 15/392,927, filed Dec. 28, 2016, 11 pages.
Non-Final Office Action mailed on Mar. 28, 2013, for U.S. Appl. No. 12/932,775, filed Mar. 4, 2011, 12 pages.
Non-Final Office Action mailed on Jan. 31, 2017, for U.S. Appl. No. 14/668,610, filed Mar. 25, 2015, 38 pages.
Non-Final Office Action mailed on Oct. 31, 2018, for U.S. Appl. No. 15/440,289, filed Feb. 23, 2017, 25 pages.
Non-Final Office Action mailed on Oct. 12, 2021 for U.S. Appl. No. 17/174,493, filed Feb. 12, 2021, 10 pages.
Notice of Allowance mailed on Jun. 1, 2020, for U.S. Appl. No. 16/111,151, filed Aug. 23, 2018, 14 pages.
Notice of Allowance mailed on Jun. 10, 2020 for U.S. Appl. No. 15/395,622, filed Dec. 30, 2016, 17 pages.
Notice of Allowance mailed on Apr. 29, 2020, for U.S. Appl. No. 16/111,151, filed Aug. 23, 2018, 17 pages.
Notice of Allowance mailed Oct. 15, 2020 on for U.S. Appl. No. 16/260,932, filed Jan. 29, 2019, 7 pages.
Notice of Allowance mailed on Jun. 15, 2020 for U.S. Appl. No. 16/260,859, filed Jan. 29, 2019, 11 pages.
Notice of Allowance mailed on Jun. 22, 2020, for U.S. Appl. No. 16/260,932, filed Jan. 29, 2019, 10 pages.
Notice of Allowance mailed Jun. 2, 2022 on for U.S. Appl. No. 16/991,859, filed Aug. 12, 2020, 10 pages.
Notice of Allowance mailed Nov. 4, 2022 on for U.S. Appl. No. 17/564,526, filed Dec. 29, 2021, 9 pages.
Notice of Allowance mailed May 5, 2021 on for U.S. Appl. No. 16/289,017, filed Feb. 28, 2019, 8 pages.
Notice of Allowance mailed Aug. 9, 2022 on for U.S. Appl. No. 17/174,493, filed Feb. 12, 2021, 2 pages.
Notice of Allowance mailed May 10, 2022 on for U.S. Appl. No. 17/174,493, filed Feb. 12, 2021, 7 pages.
Notice of Allowance mailed May 19, 2022 on for U.S. Appl. No. 16/991,802, filed Aug. 12, 2020, 7 pages.
Notice of Allowance mailed Oct. 19, 2022 on for U.S. Appl. No. 17/365,341, filed Jul. 1, 2021, 8 pages.
Notice of Allowance mailed Jun. 21, 2022 on for U.S. Appl. No. 16/991,790, filed Aug. 12, 2020, 7 pages.
Notice of Allowance mailed Nov. 23, 2022 on for U.S. Appl. No. 17/164,286, filed Feb. 1, 2021, 9 pages.
Notice of Allowance mailed Dec. 24, 2020 on for U.S. Appl. No. 16/576,329, filed Sep. 19, 2019, 11 pages.
Notice of Allowance mailed Dec. 27, 2022 on for U.S. Appl. No. 17/564,526, filed Dec. 29, 2021, 3 pages.
Notice of Allowance mailed on Aug. 1, 2022, for U.S. Appl. No. 17/164,295, filed Feb. 1, 2021, 07 pages.
Notice of Allowance mailed on Jul. 1, 2019 for U.S. Appl. No. 15/440,312, filed Feb. 23, 2017, 19 pages.
Notice of Allowance mailed on Feb. 2, 2023, for U.S. Appl. No. 17/164,302, filed Feb. 1, 2021, 7 pages.
Notice of Allowance mailed on Mar. 2, 2022, for U.S. Appl. No. 17/174,490, filed Feb. 12, 2021, 9 pages.
Notice of Allowance mailed on Jun. 3, 2019 for U.S. Appl. No. 15/440,289, filed Feb. 23, 2017, 23 pages.
Notice of Allowance mailed on Jun. 3, 2019 for U.S. Appl. No. 15/440,295, filed Feb. 23, 2017, 14 pages.
Notice of Allowance mailed on Mar. 4, 2021 for U.S. Appl. No. 15/392,542, filed Dec. 28, 2016, 09 pages.
Notice of Allowance mailed on Aug. 5, 2020 for U.S. Appl. No. 15/395,622, filed Dec. 30, 2016, 4 pages.
Notice of Allowance mailed on Jun. 5, 2018, for U.S. Appl. No. 15/392,571, filed Dec. 28, 2016, 11 pages.
Notice of Allowance mailed on Sep. 6, 2019 for U.S. Appl. No. 15/440,300, filed Feb. 23, 2017, 20 pages.
Notice of Allowance mailed on Oct. 7, 2020 for U.S. Appl. No. 16/260,859, filed Jan. 29, 2019, 7 pages.
Notice of Allowance mailed on Apr. 8, 2019 for U.S. Appl. No. 15/440,297, filed Feb. 23, 2017, 5 pages.
Notice of Allowance mailed on Jul. 8, 2019, for U.S. Appl. No. 15/440,297, filed Feb. 23, 2017, 5 pages.
Notice of Allowance mailed on Apr. 9, 2019 for U.S. Appl. No. 15/440,306, filed Feb. 23, 2017, 2 pages.
Notice of Allowance mailed on Feb. 9, 2022, for U.S. Appl. No. 16/991,802, filed Aug. 12, 2020, 2 pages.
Notice of Allowance mailed on Nov. 10, 2021, for U.S. Appl. No. 16/991,805, filed Aug. 12, 2020, 65 pages.
Notice of Allowance mailed on Apr. 11, 2019 for U.S. Appl. No. 15/396,461, filed Dec. 31, 2016, 7 pages.
Notice of Allowance mailed on Feb. 11, 2022, for U.S. Appl. No. 17/069,496, filed Oct. 13, 2020, 8 pages.
Notice of Allowance mailed on Mar. 11, 2019 for U.S. Appl. No. 15/440,306, filed Feb. 23, 2017, 8 pages.

(56) References Cited

OTHER PUBLICATIONS

Notice of Allowance mailed on Sep. 11, 2019 for U.S. Appl. No. 15/396,461, filed Dec. 31, 2016, 8 pages.
Notice of Allowance mailed on Sep. 11, 2020 for U.S. Appl. No. 16/260,929, filed Jan. 29, 2019, 10 pages.
Notice of Allowance mailed on Jun. 15, 2018, for U.S. Appl. No. 15/395,040, filed Dec. 30, 2016, 12 pages.
Notice of Allowance mailed on Feb. 16, 2023, for U.S. Appl. No. 17/092,806, filed Nov. 9, 2020, 8 pages.
Notice of Allowance mailed on Apr. 17, 2019 for U.S. Appl. No. 15/440,295, filed Feb. 23, 2017, 5 pages.
Notice of Allowance mailed on Feb. 19, 2019 for U.S. Appl. No. 15/440,300, filed Feb. 23, 2017, 8 pages.
Notice of Allowance mailed on May 19, 2020 for U.S. Appl. No. 16/260,929, filed Jan. 29, 2019, 80 pages.
Notice of Allowance mailed on Oct. 19, 2018 for U.S. Appl. No. 15/392,653, filed Dec. 28, 2016, 5 pages.
Notice of Allowance mailed on May 21, 2018 for U.S. Appl. No. 14/668,610, filed Mar. 25, 2015, 2 pages.
Notice of Allowance mailed on Feb. 22, 2022, for U.S. Appl. No. 16/991,813, filed Aug. 12, 2020, 9 pages.
Notice of Allowance mailed on Jan. 22, 2019 for U.S. Appl. No. 15/440,308, filed Feb. 23, 2017, 8 pages.
Notice of Allowance mailed on Jul. 22, 2019 for U.S. Appl. No. 15/392,927, filed Dec. 28, 2016, 8 pages.
Notice of Allowance mailed on Jul. 22, 2022, for U.S. Appl. No. 17/164,286, filed Feb. 1, 2021, 8 pages.
Notice of Allowance mailed on Mar. 22, 2022, for U.S. Appl. No. 16/991,790, filed Aug. 12, 2020, 7 pages.
Notice of Allowance mailed on Nov. 22, 2021, for U.S. Appl. No. 16/991,859, filed Aug. 12, 2020, 58 pages.
Notice of Allowance mailed on Sep. 23, 2020 for U.S. Appl. No. 16/260,929, filed Jan. 29, 2019, 5 pages.
Notice of Allowance mailed on Jul. 24, 2020 for U.S. Appl. No. 16/576,357, filed Sep. 19, 2019, 9 pages.
Notice of Allowance mailed on Jan. 25, 2023, for U.S. Appl. No. 17/509,341, filed Oct. 25, 2021, 8 pages.
Notice of Allowance mailed on Sep. 25, 2020 for U.S. Appl. No. 16/111,151, filed Aug. 23, 2018, 9 pages.
Notice of Allowance mailed on Apr. 26, 2018, for U.S. Appl. No. 14/668,610, filed Mar. 25, 2015, 12 pages.
Notice of Allowance mailed on Jan. 26, 2022, for U.S. Appl. No. 16/991,859, filed Aug. 12, 2020, 62 pages.
Notice of Allowance mailed on Dec. 28, 2017, for U.S. Appl. No. 13/965,048, filed Aug. 12, 2013, 9 pages.
Notice of Allowance mailed on Jul. 28, 2022, for U.S. Appl. No. 17/564,526, filed Dec. 29, 2021, 11 pages.
Notice of Allowance mailed on Jun. 28, 2019 for U.S. Appl. No. 15/440,306, filed Feb. 23, 2017, 5 pages.
Notice of Allowance mailed on Jun. 28, 2021 for U.S. Appl. No. 16/289,017, filed Feb. 28, 2019, 5 pages.
Notice of Allowance mailed on Jun. 28, 2022, for U.S. Appl. No. 16/991,813, filed Aug. 12, 2020, 9 pages.
Notice of Allowance mailed on May 28, 2019 for U.S. Appl. No. 15/440,300, filed Feb. 23, 2017, 8 pages.
Notice of Allowance mailed on Apr. 29, 2019 for U.S. Appl. No. 15/440,289, filed Feb. 23, 2017, 5 pages.
Notice of Allowance mailed on May 30, 2018 for U.S. Appl. No. 14/668,610, filed Mar. 25, 2015, 1 pages.
Notice of Allowance mailed on Dec. 31, 2018 for U.S. Appl. No. 15/393,874, filed Dec. 29, 2016, 5 pages.
Notice of Allowance mailed on Jan. 31, 2022, for U.S. Appl. No. 16/991,802, filed Aug. 12, 2020, 25 pages.
Notice of Allowance mailed on May 31, 2018 for U.S. Appl. No. 12/932,775, filed Mar. 4, 2011, 10 pages.
Notice of Allowance mailed on Sep. 3, 2019, for U.S. Appl. No. 15/396,461, filed Dec. 31, 2016, 7 pages.
Nunes et al., "Viscosity of Molten Sodium Nitrate," International Journal of Thermophysics, Nov. 2006, pp. 1638-1649, vol. 27, No. 6.
Olumayegun et al., "Closed-Cycle Gas Turbine for Power Generation: A State-of-the-Art Review," Fuel, Sep. 2016, pp. 694-717, vol. 180.
Parsons., "Cost Estimates for Thermal Peaking Power Plant," Parsons Brinckerhoff New Zealand Ltd, 2008, Version 2, 26 pages.
Pasch et al., "Supercritical Carbon Dioxide Closed Brayton Cycle: Development and Applications," Sandia National Laboratories, Albuquerque, NM (United States), 2014, 16 pages.
Pathirathna, K.A.B., "Gas Turbine Thermodynamic and Performance Analysis Methods Using Available Catalog Data", Faculty of Engineering and Sustainable Development, Oct. 2013, 103 pages.
Peng et al, "High-Temperature Thermal Stability of Molten Salt Materials," International Journal of Energy Research, Oct. 2008, pp. 1164-1174, vol. 32, No. 12.
Pickett et al., "Heated Turbulent Flow of Helium-Argon Mixtures in Tubes," International Journal of Heat and Mass Transfer, May 1979, pp. 705-719, vol. 22, No. 5.
Raade et al., "Development of Molten Salt Heat Transfer Fluid With Low Melting Point and High Thermal Stability," Journal of Solar Energy Engineering, Aug. 2011, pp. 031013-1 to 031013-6, vol. 133, No. 3.
Rochau, Gary E., "Supercritical CO2 Brayton Cycle Development," Advance SMR Energy Conversion, Nuclear Energy, Jun. 2014, 23 pages.
Ruer et al, "Pumped Heat Energy Storage," 2010, pp. 1-14.
Scott et al., "The Redesign and Simulated Test of a Small Closed Brayton Cycle Turbine—compressor Set for Nuclear Application," ASME 1969 Gas Turbine Conference and Products Show, 1969, 11 pages.
Silverman et al., "Survey of Technology for Storage of Thermal Energy in Heat Transfer Salt," Oak Ridge National Laboratory, ORNL/TM-5682, Jan. 1977, 32 pages.
Steinmann et al., "Thermo-Mechanical Concepts for Bulk Energy Storage," Renewable and Sustainable Energy Reviews, Nov. 2016, vol. 75, pp. 205-219.
Stiesdal et al., "Stiesdal Gridscale Battery Technology Addresses the Growing Need for Reliable, Cost-Effective Bulk Energy Storage," Stiesdal Storage Technologies, Jan. 2019, pp. 23.
Taygun et al., "Conventional and Nuclear Gas Turbines for Combined Power and Heat Production," ASME 1970 International Gas Turbine Conference and Products Show, 1970, 9 pages.
Taygun, F., "Discussion: Bureau of Mines Progress in Developing Open and Closed-Cycle Coal-Burning Gas Turbine Power Plants," Journal of Engineering for Power, Oct. 1966, pp. 320-322, vol. 88, No. 4.
Turchi, Craig, "NREL Advanced Concepts," Solar Energy Technologies Program Peer Review, May 2010, 13 pages.
Vanco, Michael R., "Analytical Comparison of Relative Heat-Transfer Coefficients and Pressure Drops of Inert Gases and Their Binary Mixtures," U.S. National Aeronautics and Space Administration, Feb. 1965, 18 pages.
Way, Julie, "Storing the Sun: Molten Salt Provides Highly Efficient Thermal Storage, " LTD, Jun. 2008, 2 pages. http://www.renewableenergyworld.com/articles/2008/06/storing-the-sun-molten-salt-provides-highly-efficient-thermalstorage-52873.html.
Wesoff, Eric, "Breakthrough in Energy Storage: Isentropic Energy," Feb. 2010, 3 pages,https://www.greentechmedia.com/articles/read/breakthrough-in-utility-scale-energy-storage-isentropic.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Yergovich et al, "Density and Viscosity of Aqueous Solutions of Methanol and Acetone from the Freezing Point to 10.degree. C," Journal of Chemical and Engineering Data, Apr. 1971, pp. 222-226, vol. 16, No. 2.
Zabrasnsky et al., "Heat Capacities of Organic Compounds in the Liquid State I. C1 to C18 1-Alkanols," Journal of Physical and Chemical Reference Data, May 1990, pp. 719-762, vol. 19, No. 3.
Advisory Action mailed on Nov. 3, 2023 for U.S. Appl. No. 17/952,722, filed Sep. 26, 2022, 3 pages.

(56) References Cited

OTHER PUBLICATIONS

European Patent Application No. 23184989.4, Extended European Search Report dated Oct. 25, 2023.
Final Office Action mailed Jul. 10, 2023 for U.S. Appl. No. 17/952,753, filed Sep. 26, 2022.
Final Office Action mailed Jun. 27, 2023 for U.S. Appl. No. 17/400,706, filed Aug. 12, 2021.
Final Office Action mailed Jun. 27, 2023 for U.S. Appl. No. 17/872,489, filed Jul. 25, 2022.
Final Office Action mailed on May 1, 2023, for U.S. Appl. No. 17/850,510, filed Jun. 27, 2022, 23 pages.
Final Office Action mailed on Aug. 1, 2023 for U.S. Appl. No. 17/952,722, filed Sep. 26, 2022, 26 pages.
International Search Report and Written Opinion of PCT Application No. PCT/US2022/052906, mailed on Apr. 18, 2023, 19 pages.
International Search Report and Written Opinion of PCT Application No. PCT/US2023/10461, mailed on Apr. 26, 2023, 15 pages.
Non-Final Office Action mailed Sep. 15, 2023 for U.S. Appl. No. 18/108,101, filed Feb. 10, 2023, 5 pages.
Non-Final Office Action mailed Apr. 28, 2023 for U.S. Appl. No. 17/777,128, filed Nov. 16, 2020.
Non-Final Office Action mailed Jun. 29, 2023 for U.S. Appl. No. 18/108,107, filed Feb. 10, 2023, 15 pages.
Non-Final Office Action mailed on Jul. 28, 2023 for U.S. Appl. No. 17/400,953, filed Aug. 12, 2021.
Non-Final Office Action mailed on Aug. 4, 2023 for U.S. Appl. No. 16/779,975, filed Feb. 3, 2020, 27 pages.
Notice of Allowance mailed May 22, 2023 on for U.S. Appl. No. 17/872,489, filed Jul. 25, 2022, 9 pages.
Notice of Allowance mailed on Nov. 2, 2023 for U.S. Appl. No. 17/952,753, filed Sep. 26, 2022, 7 pages.
Notice of Allowance mailed on Apr. 4, 2023, for U.S. Appl. No. 17/705,738, filed Mar. 28, 2022, 10 pages.
Notice of Allowance mailed on Sep. 8, 2023 for U.S. Appl. No. 17/705,738, filed Mar. 28, 2022, 9 pages.
Notice of Allowance mailed on Jun. 13, 2023 for U.S. Appl. No. 17/971,196, filed Oct. 21, 2022, 470 pages.
Notice of Allowance mailed on Sep. 13, 2023 for U.S. Appl. No. 17/872,489, filed Jul. 25, 2022, 8 pages.
Notice of Allowance mailed on May 17, 2023, for U.S. Appl. No. 17/509,341, filed Feb. 1, 2021, 7 pages.
Notice of Allowance mailed on Oct. 19, 2023 for U.S. Appl. No. 17/971,196, filed Oct. 21, 2022, 14 pages.
Notice of Allowance mailed on May 4, 2023, for U.S. Appl. No. 17/509,341, filed Oct. 25, 2021, 5 pages.
Notice of Allowance mailed on Aug. 9, 2023 for U.S. Appl. No. 17/777,128, filed Nov. 16, 2020, 10 pages.
Requirement for Restriction/Election mailed on Oct. 31, 2023 for U.S. Appl. No. 18/108,086, filed Feb. 10, 2023, 11 pages.
European Patent Application No. 21750402.6, Extended European Search Report dated Feb. 7, 2024.
European Patent Application No. 21751089.0, Extended European Search Report dated Jan. 25, 2024.
European Patent Application No. 23153026.2, Extended European Search Report dated Nov. 13, 2023.
European Patent Application No. 23208635.5, Extended European Search Report dated Jan. 26, 2024.
Final Office Action mailed Mar. 7, 2024 for U.S. Appl. No. 16/779,975, filed Feb. 3, 2020, 19 pages.
Final Office Action mailed on Dec. 14, 2023 for U.S. Appl. No. 18/108,107, filed Feb. 10, 2023, 15 pages.
International Preliminary Report on Patentability for Application No. PCT/US2022/052906, mailed on Mar. 14, 2024, 15 pages.
Non-Final Office Action mailed Mar. 6, 2024 for U.S. Appl. No. 18/237,606, filed Aug. 24, 2023, 5 pages.
Non-Final Office Action mailed Jan. 11, 2024 for U.S. Appl. No. 18/108,086, filed Feb. 10, 2023, 12 pages.
Non-Final Office Action mailed Dec. 13, 2023 for U.S. Appl. No. 18/059,121, filed Nov. 28, 2022, 6 pages.
Non-Final Office Action mailed Dec. 20, 2023 for U.S. Appl. No. 17/796,899, filed Feb. 3, 2021, 7 pages.
Non-Final Office Action mailed Nov. 20, 2023 for U.S. Appl. No. 18/051,253, filed Oct. 31, 2022, 5 pages.
Non-Final Office Action mailed Mar. 29, 2024 for U.S. Appl. No. 18/230,386, filed Aug. 4, 2023, 18 pages.
Non-Final Office Action mailed on May 10, 2024, for U.S. Appl. No. 17/832,936, filed Jun. 6, 2024, 14 pages.
Notice of Allowance mailed on Dec. 20, 2023 for U.S. Appl. No. 17/952,722, filed Sep. 26, 2022, 8 pages.
Notice of Allowance mailed on Apr. 9, 2024 for U.S. Appl. No. 18/108,107, filed Feb. 10, 2023, 9 pages.
Notice of Allowance mailed on Apr. 12, 2024 for U.S. Appl. No. 17/952,722, filed Sep. 26, 2022, 8 pages.
Notice of Allowance mailed on Apr. 15, 2024 for U.S. Appl. No. 17/796,899, filed Aug. 2, 2022, 8 pages.
Notice of Allowance mailed on Apr. 19, 2024 for U.S. Appl. No. 18/059,121, filed Nov. 28, 2022, 8 pages.
Notice of Allowance mailed on Feb. 6, 2024 for U.S. Appl. No. 18/108,101, filed Feb. 10, 2023, 9 pages.
Notice of Allowance mailed on Feb. 7, 2024 for U.S. Appl. No. 17/850,510, filed Jun. 27, 2022, 8 pages.
Notice of Allowance mailed on Feb. 21, 2024 for U.S. Appl. No. 17/850,510, filed Jun. 27, 2022, 2 pages.
Notice of Allowance mailed on Feb. 29, 2024 for U.S. Appl. No. 18/051,253, filed Oct. 31, 2022, 8 pages.
Notice of Allowance mailed on Jan. 10, 2024 for U.S. Appl. No. 17/400,953, filed Aug. 12, 2021, 11 pages.
Requirement for Restriction/Election mailed on Feb. 27, 2024 for U.S. Appl. No. 17/832,936, filed Jun. 6, 2022, 8 pages.

\* cited by examiner

BAFFLED THERMOCLINES IN THERMODYNAMIC CYCLE SYSTEMS

CROSS-REFERENCE TO RELATED APPLICATIONS

This patent application is a Continuation of co-pending U.S. patent application Ser. No. 17/365,341, filed Jul. 1, 2021, which is a Continuation of U.S. patent application Ser. No. 15/392,542, filed Dec. 28, 2016, and issued on Jul. 6, 2021 as U.S. Pat. No. 11,053,847, and the contents of each are incorporated herein by reference in their entirety.

BACKGROUND

In a heat engine or heat pump, a heat exchanger may be employed to transfer heat between a thermal storage medium and a working fluid for use with turbomachinery. The heat engine may be reversible, e.g., it may also be a heat pump, and the working fluid and heat exchanger may be used to transfer heat or cold to a plurality of thermal stores.

SUMMARY

In a closed thermodynamic cycle power generation or energy storage system, such as a reversible Brayton cycle system, a pressure vessel containing a solid thermal medium in a thermocline arrangement may be used as a parallel flow or counter-flow direct-contact heat exchanger in place of a fluid-to-fluid heat exchangers. The thermocline may be maintained through the use of internal baffles which segregate the solid thermal medium into zones within the pressure vessel.

Example thermocline vessels may include an insulated pressure vessel, an inlet for receiving a working fluid at non-atmospheric pressure, an outlet for dispatching the working fluid at non-atmospheric pressure, a solid thermal medium within the insulated pressure vessel and having porosity sufficient to allow the working fluid to flow through the solid thermal medium, a plurality of baffle structures defining a plurality of zones within the insulated pressure vessel, wherein the solid thermal medium is located within the plurality of zones, wherein each baffle structure is configured to limit direct transfer of heat between the solid thermal medium in different zones, one or more fluid channels configured to channel the working fluid past the baffles and in contact with the solid thermal medium.

Example systems may include a compressor, a first thermocline vessel comprising a plurality of zones of a solid thermal medium defined by baffle structures in the interior of the first thermocline vessel, wherein each baffle structure is configured to limit direct transfer of heat between the solid thermal medium in different zones, a turbine, and a working fluid circulating, in order, through (i) the compressor, (ii) the first thermocline vessel and the solid thermal medium in the interior of the first thermocline vessel, and (iii) the turbine, wherein the solid thermal medium within a first zone proximate to an inlet of the working fluid to the first thermocline vessel is at a first temperature, and wherein the solid thermal medium within a second zone proximate to an outlet of the working fluid from the first thermocline vessel is at a second temperature higher than the first temperature.

Example energy generation systems may include a generator configured to receive mechanical energy and generate electrical energy a working fluid, a compressor configured to compress the working fluid, a turbine configured to convert expansion of the working fluid within the turbine into mechanical energy, wherein the turbine is mechanically coupled to the compressor and is configured to transmit a portion of the mechanical energy through the mechanical coupling to drive the compressor, a recuperative heat exchanger configured to thermally contact working fluid exiting the compressor with working fluid exiting the turbine; a cooling tower configured to eject to the atmosphere heat carried by the working fluid, a hot-side thermocline vessel comprising a plurality of zones of a first solid thermal medium defined by baffle structures in the interior of the first thermocline vessel, wherein each baffle structure is configured to limit direct transfer of heat between the first solid thermal medium in different zones, and a cold-side thermocline vessel comprising a plurality of zones of a second solid thermal medium defined by baffle structures in the interior of the first thermocline vessel, wherein each baffle structure is configured to limit direct transfer of heat between the second solid thermal medium in different zones, wherein the working fluid circulates, in order, through (i) the compressor, (ii) the recuperative heat exchanger, (iii) the hot-side thermocline vessel and the first solid thermal medium in the interior of the hot-side thermocline vessel, (iv) the turbine, (v) the recuperative heat exchanger, (vi) the cooling tower, and (vii) the cold-side thermocline vessel and the second solid thermal medium in the interior of the cold-side thermocline vessel.

These as well as other aspects, advantages, and alternatives, will become apparent to those of ordinary skill in the art by reading the following detailed description, with reference where appropriate to the accompanying drawings.

DETAILED DESCRIPTION

Figure 1:
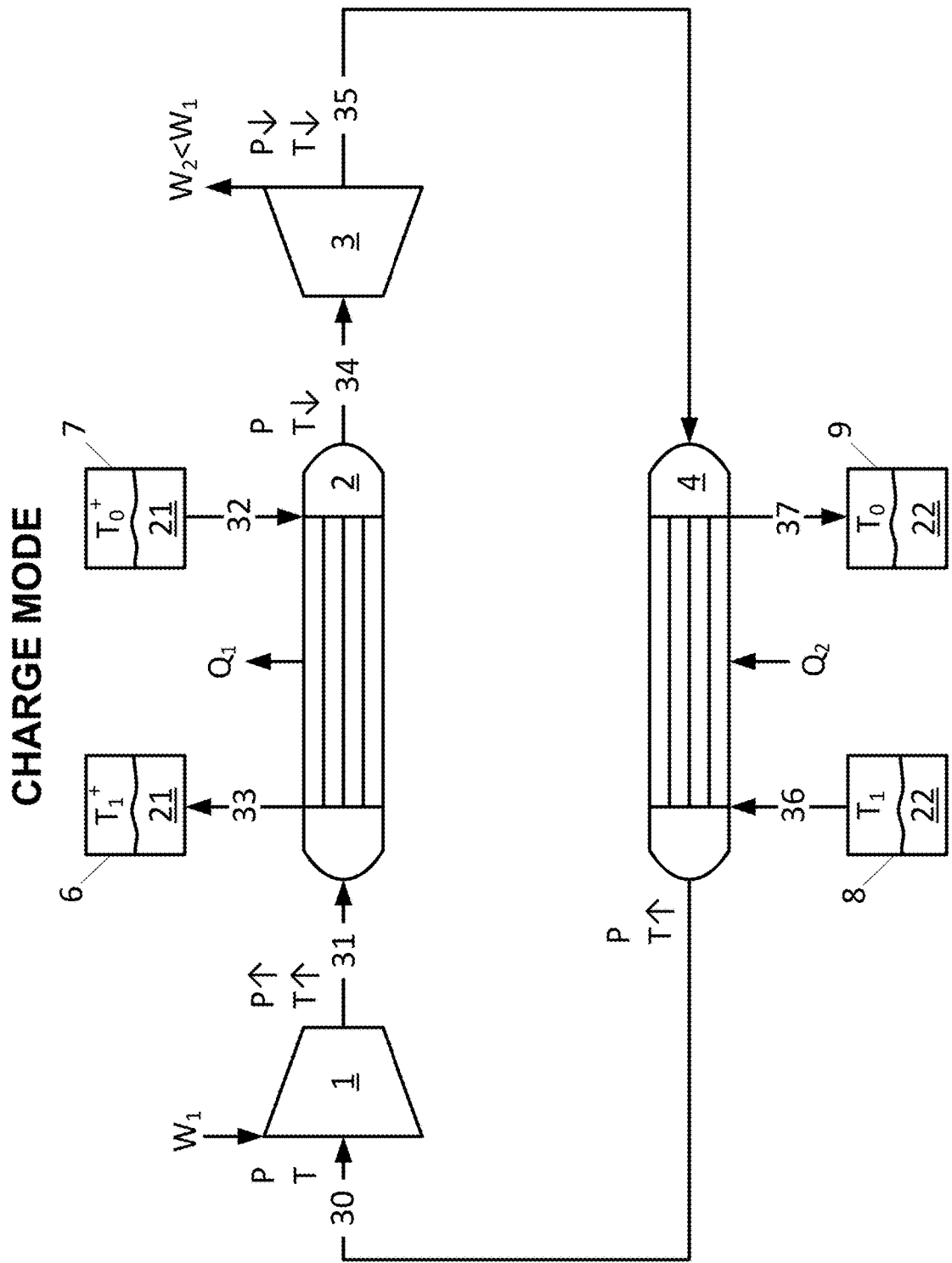
FIG. 1 is a schematic flow diagram of working fluid and heat storage media of a thermal system in a charge/heat pump mode.

Example methods and systems are described herein. It should be understood that the words "example" and/or "exemplary" are used herein to mean "serving as an example, instance, or illustration." Any embodiment or feature described herein as being an "example" or "exemplary" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

I. Overview

Reversible heat engines may use one or more solid thermal storage mediums to transfer heat to or from a working fluid. A solid thermal storage medium may be contained within a thermocline vessel where the solid thermal storage medium exists in a thermocline state with a temperature gradient across the medium. Disclosed herein are baffled thermocline vessels that may be used to help beneficially maintain that temperature gradient. An example reversible closed heat engine in which baffled thermocline vessels may be implemented is a Brayton engine system. A Brayton engine system may use a generator/motor connected to a turbine and a compressor, where the turbomachinery acts on a working fluid circulating in the system. Non-comprehensive examples of working fluids include air, argon, carbon dioxide, or gaseous mixtures. A Brayton system may have a hot side and a cold side. Each side may include a heat exchanger vessel containing a solid thermal medium The solid thermal medium may take many forms, including but not limited to, dirt, rock, gravel, sand, clay, metal, metal oxide, refractory material, refractory metal, ceramic, cermet, alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminum silicate, tungsten, molybdenum, niobium, tantalum, rhenium, beryllium, and combinations thereof. The solid thermal medium for use in cold systems may further include water ice, and/or other solid forms of common room temperature liquids. Preferably, the solid medium is structurally stable at high or low temperature, of uniform shape and/or size, and shaped such that a bolus of the solid medium includes gaps to allow a working fluid to flow through the bolus. For example, for refractory materials it may be preferable to utilize larges slabs, stackable bricks, platonic solids, spheres, cylinders, or other shapes that can be stacked and/or arranged to allow gaps between individual units of the the solid medium. For metal, metal oxides, or ceramics it may be preferable to use those shapes or fabrics or meshes that consist entirely or partially of the metal, metal oxide, or ceramic, where the fabric or mesh has a porosity sufficient to allow passage of a working fluid through the solid medium.

The hot-side solid thermal medium may reach temperatures over 600° C. and, if the heat exchanger vessel operates as direct contact between the working fluid and the hot-side solid thermal medium, the pressure may be over over 100 bars . Similarly, cold-side thermal medium can go below −70° C. and be at or near vacuum state in the heat exchanger.

It may be desirable to configure a Brayton cycle heat exchanger vessel as a counter-flow heat exchanger to maximize efficiency of the thermal cycle. Preferably, this may be implemented via a thermocline, or temperature gradient within the heat exchanger vessel, wherein the heat exchanger vessel may include a pressure vessel. For a hot-side heat exchanger vessel in a discharging Brayton cycle, the entering working fluid preferably contacts the coldest solid thermal medium at the entrance to the heat exchanger vessel and contacts the hottest solid thermal medium at the exit to the heat exchanger vessel. For a cold-side heat exchanger in a discharging Brayton cycle, the entering working fluid preferably contacts the hottest solid thermal medium at the entrance to the heat exchanger and contacts the coldest solid thermal medium at the exit to the heat exchanger. The contact between the working fluid and the solid thermal medium may be direct contact or indirect thermal contact depending on the configuration. In a charging Brayton cycle, the contacting order would preferably be reversed.

Disadvantageously, the solid thermal medium in a thermocline arrangement within a heat exchanger vessel may conduct, convect, and/or radiate heat from hot portions of the solid thermal medium to cold portions until equilibrium is reached throughout the solid thermal medium. Non-beneficial direct transfer of heat through the solid thermal medium may include conductive heat transfer from a portion of the solid thermal medium in direct contact with another portion of the solid thermal medium, or in contact through a thermal transfer medium such as an uninsulated and/or conductive surface of the heat exchanger vessel. Direct transfer of heat may also include radiative (or emissive) heat transfer from a portion of solid thermal medium to another portion of solid thermal medium, where the two portions are not in direct contact. For purposes herein, direct transfer of heat does not include heat transfer by means of a working fluid passing over solid thermal medium, where the working fluid carries heat from one portion of the solid thermal medium to another portion. Prior to thermal equilibrium, conductive and/or radiative heat transfer through or among the solid thermal medium will reduce the maximum temperature difference across the thermocline and potentially reduce overall thermal efficiency of a thermodynamic (e.g. Brayton) cycle employing a direct contact thermocline heat exchanger.

To mitigate direct heat transfer within the solid thermal storage medium, one or more baffle structures may be included in the heat exchanger vessel to create zones within the heat exchanger vessel. Each zone may contain a portion of the total quantity of the solid thermal medium in the heat exchanger vessel and the baffle structures may limit direct transfer of heat between the solid thermal medium in one zone to the solid thermal medium in a different zone.

The baffle structures may take forms configured to limit direct transfer of heat between the solid thermal medium in different zones, while still allowing a working fluid to reach the the solid thermal medium while flowing through the heat exchanger. For example, a baffle structure may be an insulated wall extending partially across the heat exchanger, leaving a space for working fluid flow between an end of the insulated wall and an interior wall of the pressure vessel. As another example, a baffle structure may be an insulated wall extending completely across the heat exchanger. The wall may include fluid channels through the wall that allow a working fluid to flow through the wall. The working fluid may flow throughout the heat exchanger or may be constrained to runners that traverse the heat exchanger and are in thermal contact with the solid thermal medium.

The fluid channels may be sized or located to limit or prevent the movement of the solid thermal medium through the fluid channels. Alternatively or additionally, the fluid channels may be sized, located, and/or shaped to limit the effect of radiative heat transfer. For example, a fluid channel may be angled or convoluted in form such that there is no, or limited, line-of-sight between the solid thermal medium on one side of the fluid channel and the solid thermal medium on the other side of the fluid channel. Similarly, another baffle structure may be a perforated material extending across the heat exchanger. The perforated material may be physically separated from the the solid thermal medium to prevent or limit conductive heat transfer and the perforations may act similarly to the wall-based fluid channels described above. Other baffle structures may include insulated chambers within the heat exchanger that each contain the solid thermal medium and a plurality of fluid channels that allow a working fluid to enter the chamber, contact the solid thermal medium directly or through runners, and exit the chamber.

II. Illustrative Reversible Heat Engine

Systems and devices in which example embodiments may be implemented will now be described in greater detail. However, an example system may also be implemented in or take the form of other devices, without departing from the scope of the invention.

An aspect of the disclosure relates to thermal systems operating on thermal storage cycles. In some examples, the cycles allow electricity to be stored as heat (e.g., in the form of a temperature differential) and then converted back to mechanical work and ultimately electricity through the use of at least two pieces of turbomachinery (a compressor and a turbine), and a generator. The compressor consumes work and raises the temperature and pressure of a working fluid (WF). The turbine produces work and lowers the temperature and pressure of the working fluid. In example systems, more than one compressor and/or more than one turbine may be used. The compressors may be arranged in series or in parallel. The turbines may be arranged in series or in parallel.

Figure 2:
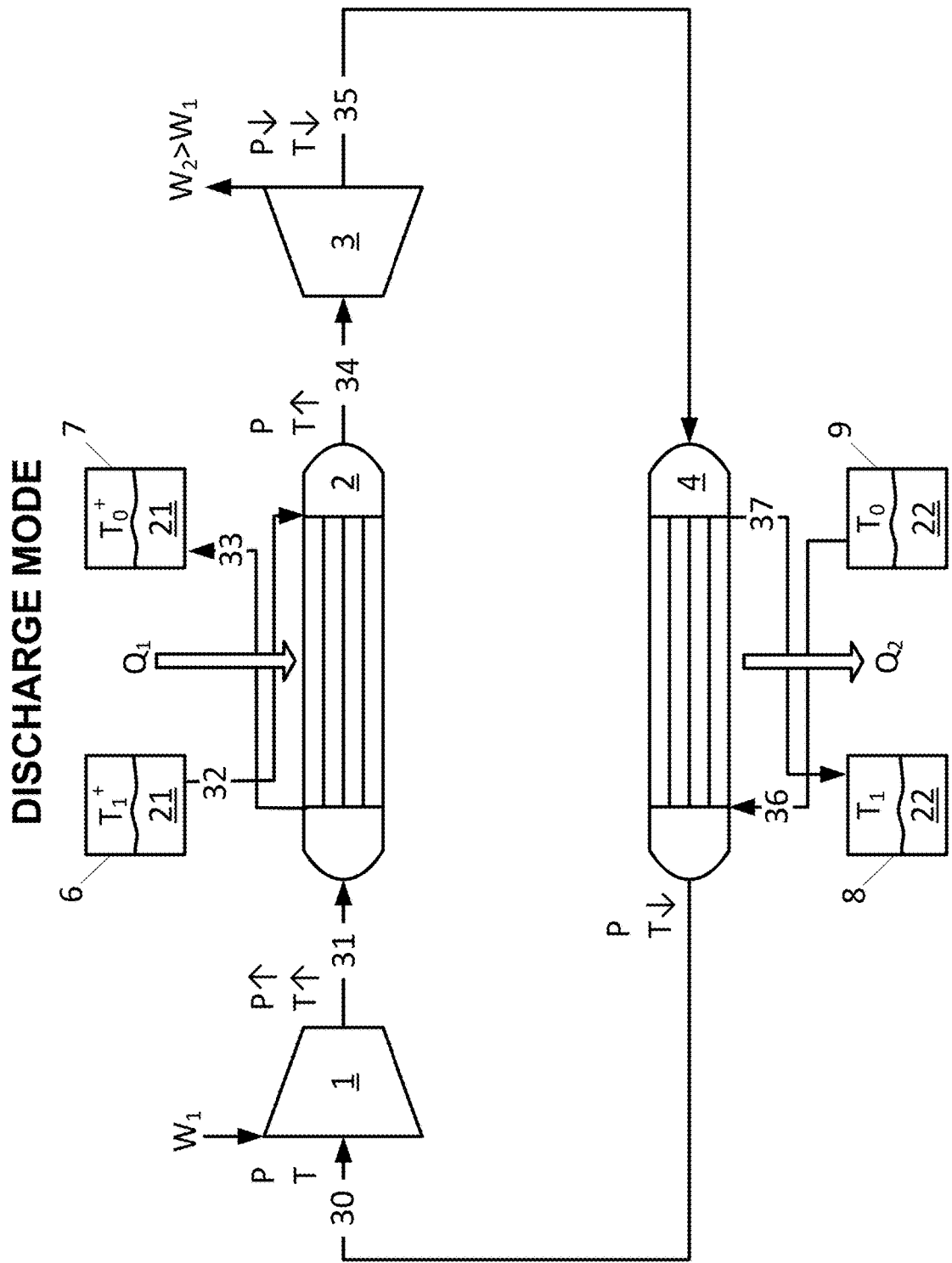
FIG. 2 is a schematic flow diagram of working fluid and heat storage media of a thermal system in a discharge/heat engine mode.

FIGS. 1 and 2 are schematic flow diagrams of working fluid and heat storage medium of an example thermal system in a charge/heat pump mode and in a discharge/heat engine mode, respectively. The system may be idealized for simplicity of explanation so that there are no losses (i.e., entropy generation) in either the turbomachinery or heat exchangers. The system can include a working fluid (e.g., argon gas) flowing in a closed cycle between a compressor 1, a hot side heat exchanger 2, a turbine 3 and a cold side heat exchanger 4. Fluid flow paths/directions for the working fluid (e.g., a gas), a hot side thermal storage (HTS) medium 21 (e.g., a low viscosity liquid or a solid medium) and a cold side thermal storage (CTS) medium 22 (e.g., a low viscosity liquid or a solid medium, which may be different from the HTS medium) are indicated by arrows. The heat exchangers 2 and 4 exchangers may incorporate, for example, conventional liquid-to-gas exchange for liquid thermal storage media (e.g., tube-and-shell exchangers or plate exchanger) and solid-to-gas exchange (e.g., direct contact) for the solid thermal medium and may require pumping and/or conveyance mechanisms for the media.

Figure 3B:
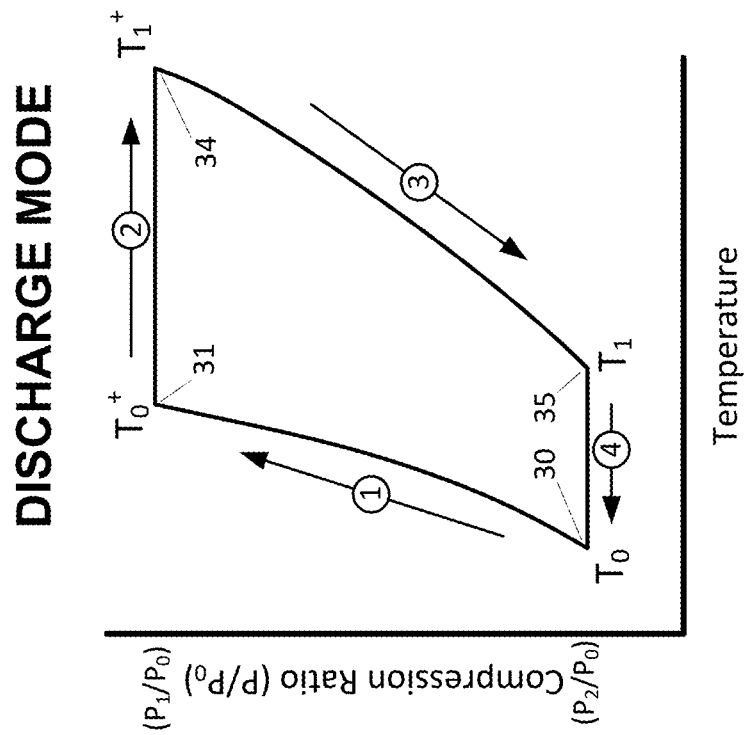
FIG. 3B is a schematic pressure and temperature diagram of the working fluid as it undergoes the discharge cycle in FIG. 2.
Figure 3A:
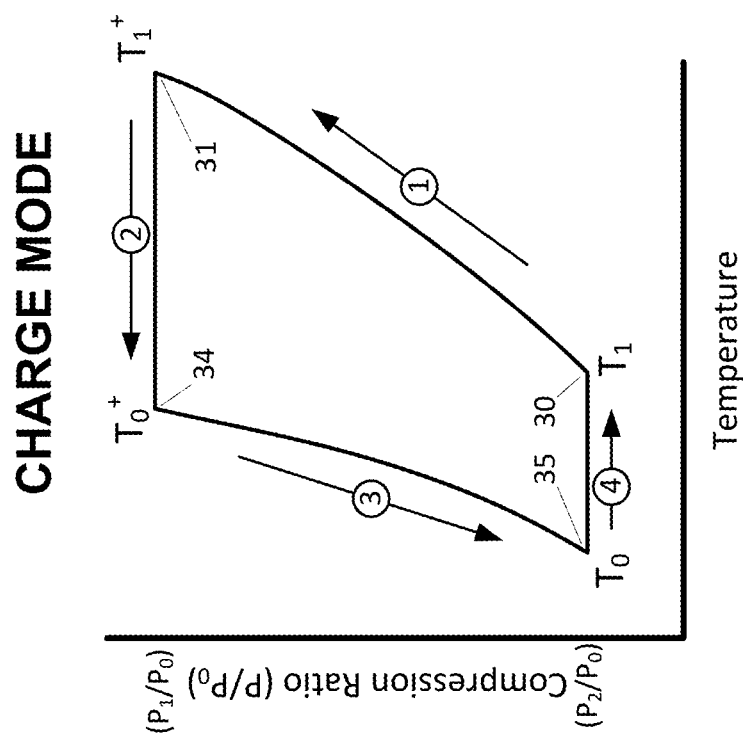
FIG. 3A is a schematic pressure and temperature diagram of the working fluid as it undergoes the charge cycle in FIG. 1.

FIGS. 3A and 3B are schematic pressure and temperature diagrams of the working fluid as it undergoes the charge cycles in FIGS. 1 and 2, respectively, once again simplified in the approximation of no entropy generation. Normalized pressure is shown on the y-axes and temperature is shown on the x-axes. The direction of processes taking place during the cycles is indicated with arrows, and the individual processes taking place in the compressor 1, the hot side CFX 2, the turbine 3 and the cold side CFX 4 are indicated on the diagram with their respective circled numerals.

The heat exchangers 2 and 4 can be configured as counter-flow heat exchangers (CFXs), where the working fluid flows in one direction and the substance it is exchanging heat with is flowing or moving or has a temperature gradient in the opposite direction. In an ideal counter-flow heat exchanger with correctly matched flows (i.e., balanced capacities or capacity flow rates or thermocline gradient), the temperatures of the working fluid and thermal storage medium flip (i.e., the counter-flow heat exchanger can have unity effectiveness).

The counter-flow heat exchangers 2 and 4 can be designed and/or operated to reduce entropy generation in the heat exchangers to negligible levels compared to entropy generation associated with other system components and/or processes (e.g., compressor and/or turbine entropy generation). In some cases, the system may be operated such that entropy generation in the system is minimized. For example, the system may be operated such that entropy generation associated with heat storage units is minimized. In some cases, a temperature difference between fluid or solid elements exchanging heat can be controlled during operation such that entropy generation in hot side and cold side heat storage units is minimized. In some instances, the entropy generated in the hot side and cold side heat storage units is negligible when compared to the entropy generated by the compressor, the turbine, or both the compressor and the turbine. In some instances, entropy generation associated with heat transfer in the heat exchangers 2 and 4 and/or entropy generation associated with operation of the hot side storage unit, the cold side storage unit or both the hot side and cold side storage units can be less than about 50%, less than about 25%, less than about 20%, less than about 15%, less than about 10%, less than about 5%, less than about 4%, less than about 3%, less than about 2%, or less than about 1% of the total entropy generated within the system (e.g., entropy generated by the compressor 1, the hot side heat exchanger 2, the turbine 3, the cold side heat exchanger 4 and/or other components described herein, such as, for example, a recuperator). For example, entropy generation can be reduced or minimized if the two substances exchanging heat do so at a local temperature differential $\Delta T \rightarrow 0$ (i.e., when the temperature difference between any two fluid or solid media elements that are in close thermal contact in the heat exchanger is small). In some examples, the temperature differential $\Delta T$ between any two fluid or solid media elements that are in close thermal contact may be less than about 300 Kelvin (K), less than about 200 K, less than about 100 K, less than about 75 K, less than about 50 K, less than about 40 K, less than about 30 K, less than about 20 K, less than about 10 K, less than about 5 K, less than about 3 K, less than about 2 K, or less than about 1 K. In another example, entropy generation associated with pressure drop can be reduced or minimized by suitable design. In some examples, the heat exchange process can take place at a constant or near-constant pressure. Alternatively, a non-negligible pressure drop may be experienced by the working fluid and/or one or more thermal storage media during passage through a heat exchanger. Pressure drop in heat exchangers may be controlled (e.g., reduced or minimized) through suitable heat exchanger design. In some examples, the pressure drop across each heat exchanger may be less than about 20% of inlet pressure, less than about 10% of inlet pressure, less than about 5% of inlet pressure, less than about 3% of inlet pressure, less than about 2% of inlet pressure, less than about 1% of inlet pressure, less than about 0.5% of inlet pressure, less than about 0.25% of inlet pressure, or less than about 0.1% of inlet pressure.

Upon entering the heat exchanger 2, the temperature of the working fluid can either increase (taking heat from the HTS medium 21, corresponding to the discharge mode in FIGS. 2 and 3B) or decrease (giving heat to the HTS medium 21, corresponding to the charge mode in FIGS. 1 and 3A), depending on the temperature of the HTS medium in the heat exchanger relative to the temperature of the working fluid. Similarly, upon entering the heat exchanger 4, the temperature of the working fluid can either increase (taking heat from the CTS medium 22, corresponding to the charge mode in FIGS. 1 and 3A) or decrease (giving heat to the CTS medium 22, corresponding to the discharge mode in FIGS. 2 and 3B), depending on the temperature of the CTS medium in the heat exchanger relative to the temperature of the working fluid.

As described in more detail with reference to the charge mode in FIGS. 1 and 3A, the heat addition process in the cold side CFX 4 can take place over a different range of temperatures than the heat removal process in the hot side CFX 2. Similarly, in the discharge mode in FIGS. 2 and 3B, the heat rejection process in the cold side CFX 4 can take place over a different range of temperatures than the heat addition process in the hot side CFX 2. At least a portion of the temperature ranges of the hot side and cold side heat exchange processes may overlap during charge, during discharge, or during both charge and discharge.

As used herein, the temperatures $T_0$, $T_1$, $T_0^+$ and $T_1^+$ are so named because $T_0^+$, $T_1^+$ are the temperatures achieved at the exit of a compressor with a given compression ratio r, adiabatic efficiency $\eta_c$ and inlet temperatures of $T_0$, $T_1$ respectively. The examples in FIGS. 1, 2, 3A and 3B can be idealized examples where $f_c=1$ and where adiabatic efficiency of the turbine $\eta_t$ also has the value $\eta_t=1$.

With reference to the charge mode shown in FIGS. 1 and 3A, the working fluid can enter the compressor 1 at position 30 at a pressure P and a temperature T (e.g., at $T_1$, $P_2$). As the working fluid passes through the compressor, work $W_1$ is consumed by the compressor to increase the pressure and temperature of the working fluid (e.g., to $T_1^+$, $P_1$), as indicated by P↑ and T↑ at position 31. In the charge mode, the temperature $T_1^+$ of the working fluid exiting the compressor and entering the hot side CFX 2 at position 31 is higher than the temperature of the HTS medium 21 entering the hot side CFX 2 at position 32 from a second hot side thermal storage tank 7 at a temperature $T_0^+$ (i.e., $T_0^+ < T_1^+$). As these working fluid and thermal medium pass in thermal contact with each other in the heat exchanger, the working fluid's temperature decreases as it moves from position 31 to position 34, giving off heat $Q_1$ to the HTS medium, while the temperature of the HTS medium in turn increases as it moves from position 32 to position 33, absorbing heat Q1 from the working fluid. In an example, the working fluid exits the hot side CFX 2 at position 34 at the temperature $T_0^+$ and the HTS medium exits the hot side CFX 2 at position 33 into a first hot side thermal storage tank 6 at the temperature $T_1^+$. The heat exchange process can take place at a constant or near-constant pressure such that the working fluid exits the hot side CFX 2 at position 34 at a lower temperature but same pressure $P_1$, as indicated by P and T↓, at position 34. Similarly, the temperature of the HTS medium 21 increases in the hot side CFX 2, while its pressure can remain constant or near-constant.

Upon exiting the hot side CFX 2 at position 34 (e.g., at $T_0^+$, $P_1$), the working fluid undergoes expansion in the turbine 3 before exiting the turbine at position 35. During the expansion, the pressure and temperature of the working fluid decrease (e.g., to $T_0$, $P_2$), as indicated by P↓, and T↓ at position 35. The magnitude of work $W_2$ generated by the turbine depends on the enthalpy of the working fluid entering the turbine and the degree of expansion. In the charge mode, heat is removed from the working fluid between positions 31 and 34 (in the hot side CFX 2) and the working fluid is expanded back to the pressure at which it initially entered the compressor at position 30 (e.g., $P_2$). The compression ratio (e.g., $P_1/P_2$) in the compressor 1 being equal to the expansion ratio in the turbine 3, and the enthalpy of the gas entering the turbine being lower than the enthalpy of the gas exiting the compressor, the work $W_2$ generated by the turbine 3 is smaller than the work $W_1$ consumed by the compressor 1 (i.e., $W_2<W_1$).

Because heat was taken out of the working fluid in the hot side CFX 2, the temperature $T_0$ at which the working fluid exits the turbine at position 35 is lower than the temperature $T_1$ at which the working fluid initially entered the compressor at position 30. To close the cycle (i.e., to return the pressure and temperature of the working fluid to their initial values $T_1$, $P_2$ at position 30), heat $Q_2$ is added to the working fluid from the CTS medium 22 in the cold side CFX 4 between positions 35 and 30 (i.e., between the turbine 3 and the compressor 1). In an example, the CTS medium 22 enters the cold side CFX 4 at position 36 from a first cold side thermal storage tank 8 at the temperature $T_1$ and exits the cold side CFX 4 at position 37 into a second cold side thermal storage tank 9 at the temperature $T_0$, while the working fluid enters the cold side CFX 4 at position 35 at the temperature $T_0$ and exits the cold side CFX 4 at position 30 at the temperature $T_1$. Again, the heat exchange process can take place at a constant or near-constant pressure such that the working fluid exits the cold side CFX 2 at position 30 at a higher temperature but same pressure $P_2$, as indicated by P and T↑ at position 30. Similarly, the temperature of the CTS medium 22 decreases in the cold side CFX 2, while its pressure can remain constant or near-constant.

During charge, the heat $Q_2$ is removed from the CTS medium and the heat $Q_1$ is added to the HTS medium, wherein $Q_1>Q_2$. A net amount of work ($W_1-W_2$) is consumed, since the work $W_1$ used by the compressor is greater than the work $W_2$ generated by the turbine. A device that consumes work while moving heat from a cold body or thermal storage medium to a hot body or thermal storage medium may be considered a heat pump; thus, the thermal system in the charge mode may operate as a heat pump.

In an example, the discharge mode shown in FIGS. 2 and 3B can differ from the charge mode shown in FIGS. 1 and 3A in the temperatures of the thermal storage media being introduced into the heat exchangers. The temperature at which the HTS medium enters the hot side CFX 2 at position 32 is $T_1^+$ instead of $T_0^+$, and the temperature of the CTS medium entering the cold side CFX 4 at position 36 is $T_0$ instead of $T_1$. During discharge, the working fluid enters the compressor at position 30 at $T_0$ and $P_2$, exits the compressor at position 31 at $T_0^+ < T_1^+$ and $P_1$, absorbs heat from the HTS medium in the hot side CFX 2, enters the turbine 3 at position 34 at $T_1^+$ and P1, exits the turbine at position 35 at $T_1 > T_0$ and $P_2$, and finally rejects heat to the CTS medium in the cold side CFX 4, returning to its initial state at position 30 at $T_0$ and $P_2$.

The HTS medium at temperature $T_1^+$ can be stored in a first hot side thermal storage tank 6, the HTS medium at temperature $T_0^+$ can be stored in a second hot side thermal storage tank 7, the CTS medium at temperature $T_1$ can be stored in a first cold side thermal storage tank 8, and the CTS medium at temperature $T_0$ can be stored in a second cold side thermal storage tank 9 during both charge and discharge modes. In one implementation, the inlet temperature of the HTS medium at position 32 can be switched between $T_1^+$ and $T_0^+$ by switching between tanks 6 and 7, respectively. Similarly, the inlet temperature of the CTS medium at position 36 can be switched between $T_1$ and $T_0$ by switching between tanks 8 and 9, respectively. Switching between tanks can be achieved by including a valve or a system of valves, or a conveyance system or a group of conveyance systems, for switching connections between the hot side heat exchanger 2 and the hot side tanks 6 and 7, and/or between the cold side heat exchanger 4 and the cold side tanks 8 and 9 as needed for the charge and discharge modes. In some implementations, connections may be switched on the working fluid side instead, while the connections of storage tanks 6, 7, 8 and 9 to the heat exchangers 2 and 4 remain static. In some examples, flow paths and connections to the heat exchangers may depend on the design (e.g., shell-and-tube or direct-contact) of each heat exchanger. In some implementations, one or more valves or conveyance systems can be used to switch the direction of both the working fluid and the heat storage media through the counter-flow heat exchanger on charge and discharge. Such configurations may be used, for example, due to high thermal storage capacities of the heat exchanger component, to decrease or eliminate temperature transients, or a combination thereof. In some implementations, one or more valves or conveyance systems can be used to switch the direction of only the working fluid, while the direction of the HTS or CTS can be changed by changing the direction of pumping or conveyance, thereby maintaining the counter-flow configuration. In some implementations, different valve configurations or conveyance systems may be used for the HTS and the CTS. Further, any combination of the valve or conveyance configurations herein may be used. For example, the system may be configured to operate using different valve or conveyance configurations in different situations (e.g., depending on system operating conditions).

In the discharge mode shown in FIGS. 2 and 3B, the working fluid can enter the compressor 1 at position 30 at a pressure P and a temperature T (e.g., at $T_0$, $P_2$). As the working fluid passes through the compressor, work $W_1$ is consumed by the compressor to increase the pressure and temperature of the working fluid (e.g., to $T_0^+$, $P_1$), as indicated by P↑ and T↑ at position 31. In the discharge mode, the temperature $T_0+$ of the working fluid exiting the compressor and entering the hot side CFX 2 at position 31 is lower than the temperature of the HTS medium 21 entering the hot side CFX 2 at position 32 from a first hot side thermal storage tank 6 at a temperature $T_1^+$ (i.e., $T_0^+ < T_1^+$). As these two fluids pass in thermal contact with each other in the heat exchanger, the working fluid's temperature increases as it moves from position 31 position 34, absorbing heat $Q_1$ from the HTS medium, while the temperature of the HTS medium in turn decreases as it moves from position 32 to position 33, giving off heat $Q_1$ to the working fluid. In an example, the working fluid exits the hot side CFX 2 at position 34 at the temperature $T_1^+$ and the HTS medium exits the hot side CFX 2 at position 33 into the second hot side thermal storage tank 7 at the temperature $T_0^+$. The heat exchange process can take place at a constant or near-constant pressure such that the working fluid exits the hot side CFX 2 at position 34 at a higher temperature but same pressure $P_1$, as indicated by P and T↑ at position 34. Similarly, the temperature of the HTS medium 21 decreases in the hot side CFX 2, while its pressure can remain constant or near-constant.

Upon exiting the hot side CFX 2 at position 34 (e.g., at $T_1^+$, $P_1$), the working fluid undergoes expansion in the turbine 3 before exiting the turbine at position 35. During the expansion, the pressure and temperature of the working fluid decrease (e.g., to $T_1$, $P_2$), as indicated by P↓ and T↓ at position 35. The magnitude of work $W_2$ generated by the turbine depends on the enthalpy of the working fluid entering the turbine and the degree of expansion. In the discharge mode, heat is added to the working fluid between positions 31 and 34 (in the hot side CFX 2) and the working fluid is expanded back to the pressure at which it initially entered the compressor at position 30 (e.g., $P_2$). The compression ratio (e.g., $P_1/P_2$) in the compressor 1 being equal to the expansion ratio in the turbine 3, and the enthalpy of the gas entering the turbine being higher than the enthalpy of the gas exiting the compressor, the work $W_2$ generated by the turbine 3 is greater than the work $W_1$ consumed by the compressor 1 (i.e., $W_2 > W_1$).

Because heat was added to the working fluid in the hot side CFX 2, the temperature $T_1$ at which the working fluid exits the turbine at position 35 is higher than the temperature $T_0$ at which the working fluid initially entered the compressor at position 30. To close the cycle (i.e., to return the pressure and temperature of the working fluid to their initial values $T_0$, $P_2$ at position 30), heat $Q_2$ is rejected by the working fluid to the CTS medium 22 in the cold side CFX 4 between positions 35 and 30 (i.e., between the turbine 3 and the compressor 1). The CTS medium 22 enters the cold side CFX 4 at position 36 from a second cold side thermal storage tank 9 at the temperature $T_0$ and exits the cold side CFX 4 at position 37 into a first cold side thermal storage tank 8 at the temperature $T_1$, while the working fluid enters the cold side CFX 4 at position 35 at the temperature $T_1$ and exits the cold side CFX 4 at position 30 at the temperature $T_0$. Again, the heat exchange process can take place at a constant or near-constant pressure such that the working fluid exits the cold side CFX 2 at position 30 at a higher temperature but same pressure $P_2$, as indicated by P and T↓ at position 30. Similarly, the temperature of the CTS medium 22 increases in the cold side CFX 2, while its pressure can remain constant or near-constant.

During discharge, the heat $Q_2$ is added to the CTS medium and the heat $Q_1$ is removed from the HTS medium, wherein $Q_1 > Q_2$. A net amount of work $(W_2 - W_1)$ is generated, since the work $W_1$ used by the compressor is smaller than the work $W_2$ generated by the turbine. A device that generates work while moving heat from a hot body or thermal storage medium to a cold body or thermal storage medium is a heat engine; thus, the thermal system in the discharge mode operates as a heat engine.

Another aspect of the disclosure is directed to thermal systems with regeneration/recuperation. In some situations, the terms regeneration and recuperation can be used interchangeably, although they may have different meanings. As used herein, the terms "recuperation" and "recuperator" generally refer to the presence of one or more additional heat exchangers where the working fluid exchanges heat with itself during different segments of a thermodynamic cycle through continuous heat exchange without intermediate thermal storage. As used herein, the terms "regeneration" and "regenerator" may be used to describe the same configuration as the terms "recuperation" and "recuperator." The roundtrip efficiency of thermal systems may be substantially improved if the allowable temperature ranges of the storage materials can be extended. In some implementations, this may be accomplished by choosing a material or medium on the cold side that can go to temperatures below 273 K (0° C.). For example, a CTS medium (e.g., hexane) with a low temperature limit of approximately $T_0$=179 K (−94° C.) may be used in a system with a molten salt or solid HTS medium. However, $T_0^+$ (i.e., the lowest temperature of the working fluid in the hot side heat exchanger) at some (e.g., modest) compression ratios may be below the freezing point of the molten salt, making the molten salt unviable as the HTS medium. In some implementations, this can be resolved by including a working fluid to working fluid (e.g., gas-gas) heat exchanger (also "recuperator" or "regenerator" herein) in the cycle.

Figure 4:
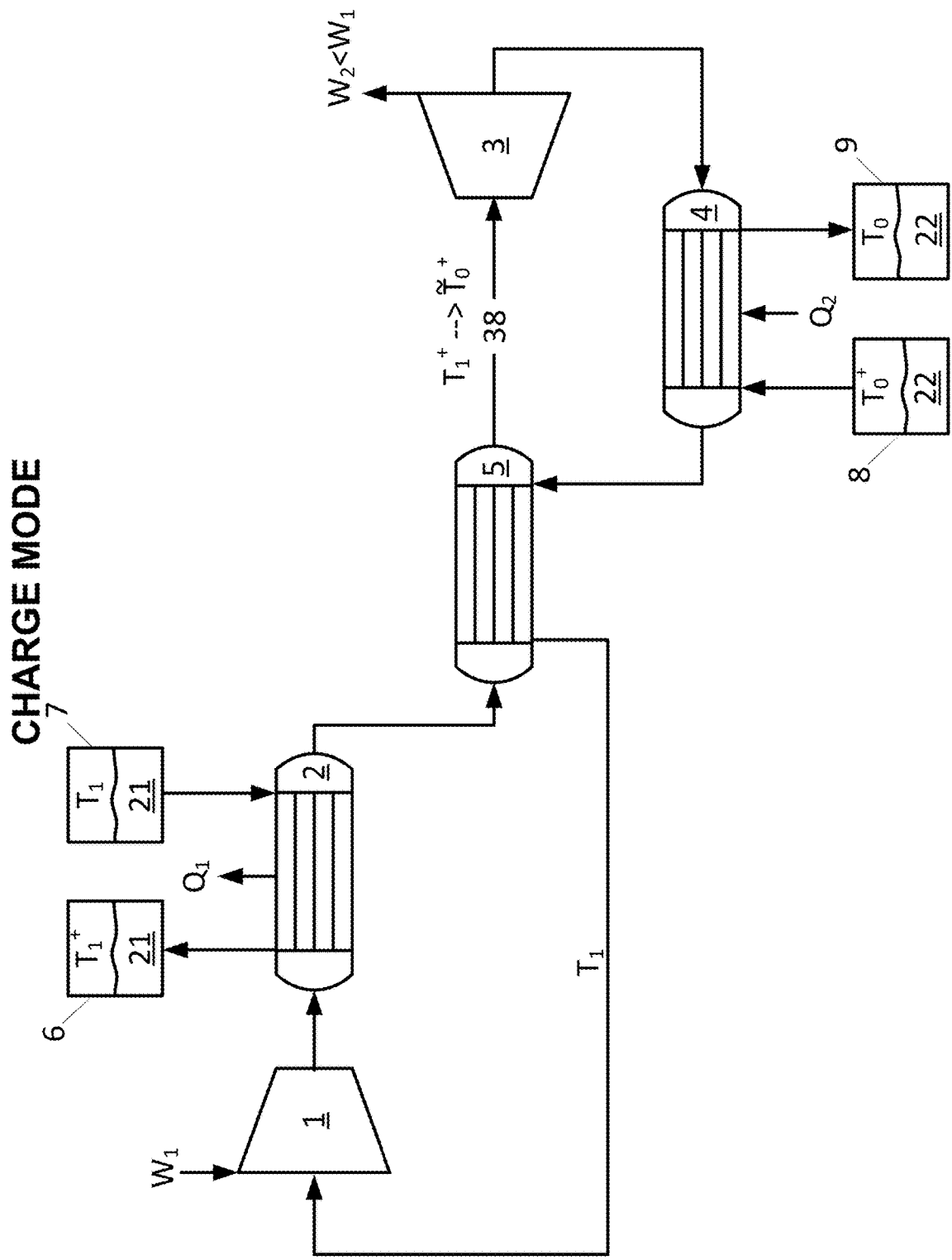
FIG. 4 is a schematic flow diagram of working fluid and heat storage media of a thermal system with a gas-gas heat exchanger for the working fluid in a charge/heat pump mode.

FIG. 4 is a schematic flow diagram of working fluid and heat storage media of a thermal system in a charge/heat pump mode with a gas-gas heat exchanger 5 for the working fluid. The use of the gas-gas heat exchanger can enable use of colder heat storage medium on the cold side of the system. As examples, the working fluid can be air, argon, or a mixture of primarily argon mixed with another gas such as helium. For example, the working fluid may comprise at least about 50% argon, at least about 60% argon, at least about 70% argon, at least about 80% argon, at least about 90% argon, or about 100% argon, with balance helium.

Figure 6A:
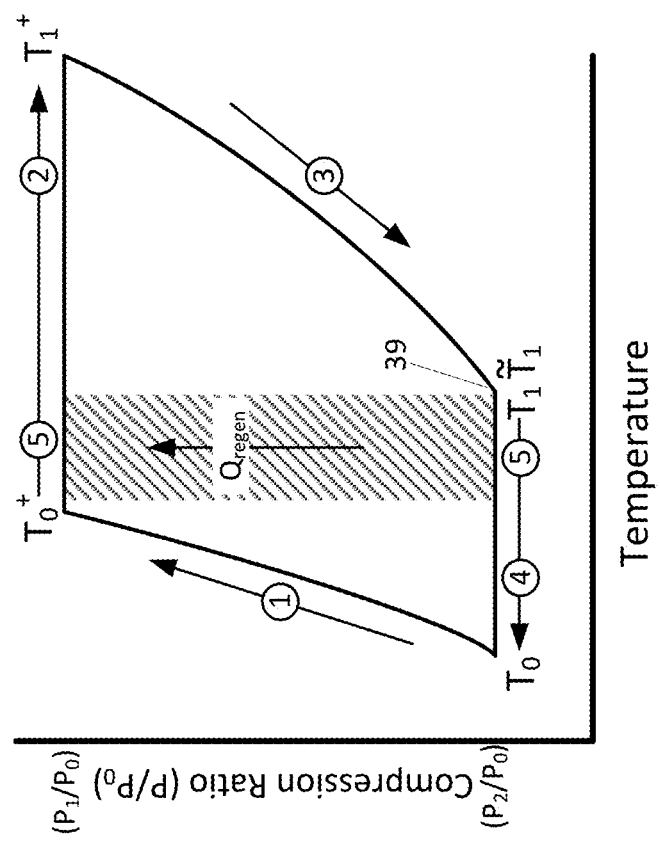
FIG. 6A is a schematic pressure and temperature diagram of the working fluid as it undergoes the charge cycle in FIG. 4.

FIG. 6A shows a heat storage charge cycle for the storage system in FIG. 4 with a cold side storage medium (e.g., liquid hexane or heptane or solid thermal medium) capable of going down to approximately to 179 K (−94° C.) and a molten salt or a solid thermal medium as the hot side storage, and $\eta_c$=0.9 and $\eta_t$=0.95. In some cases, the system can include more than four heat storage tanks.

In one implementation, during charge in FIGS. 4 and 6A, the working fluid enters the compressor at $T_1$ and $P_2$, exits the compressor at $T_1^+$ and $P_1$, rejects heat $Q_1$, to the HTS medium 21 in the hot side CFX 2, exiting the hot side CFX 2 at $T_1$ and $P_1$, rejects heat $Q_{recup}$ (also "$Q_{regen}$" herein, as shown, for example, in the accompanying drawings) to the cold (low pressure) side working fluid in the heat exchanger or recuperator 5, exits the recuperator 5 at $T_0^+$ and $P_1$, rejects heat to the environment (or other heat sink) in section 38 (e.g., a radiator), enters the turbine 3 at $\tilde{T}_0^+$ and $P_1$, exits the turbine at $T_0$ and $P_2$, absorbs heat $Q_2$ from the CTS medium 22 in the cold side CFX 4, exiting the cold side CFX 4 at $T_0^+$ and $P_2$, absorbs heat $Q_{recup}$ from the hot (high pressure) side working fluid in the heat exchanger or recuperator 5, and finally exits the recuperator 5 at $T_1$ and $P_2$, returning to its initial state before entering the compressor.

Figure 5:
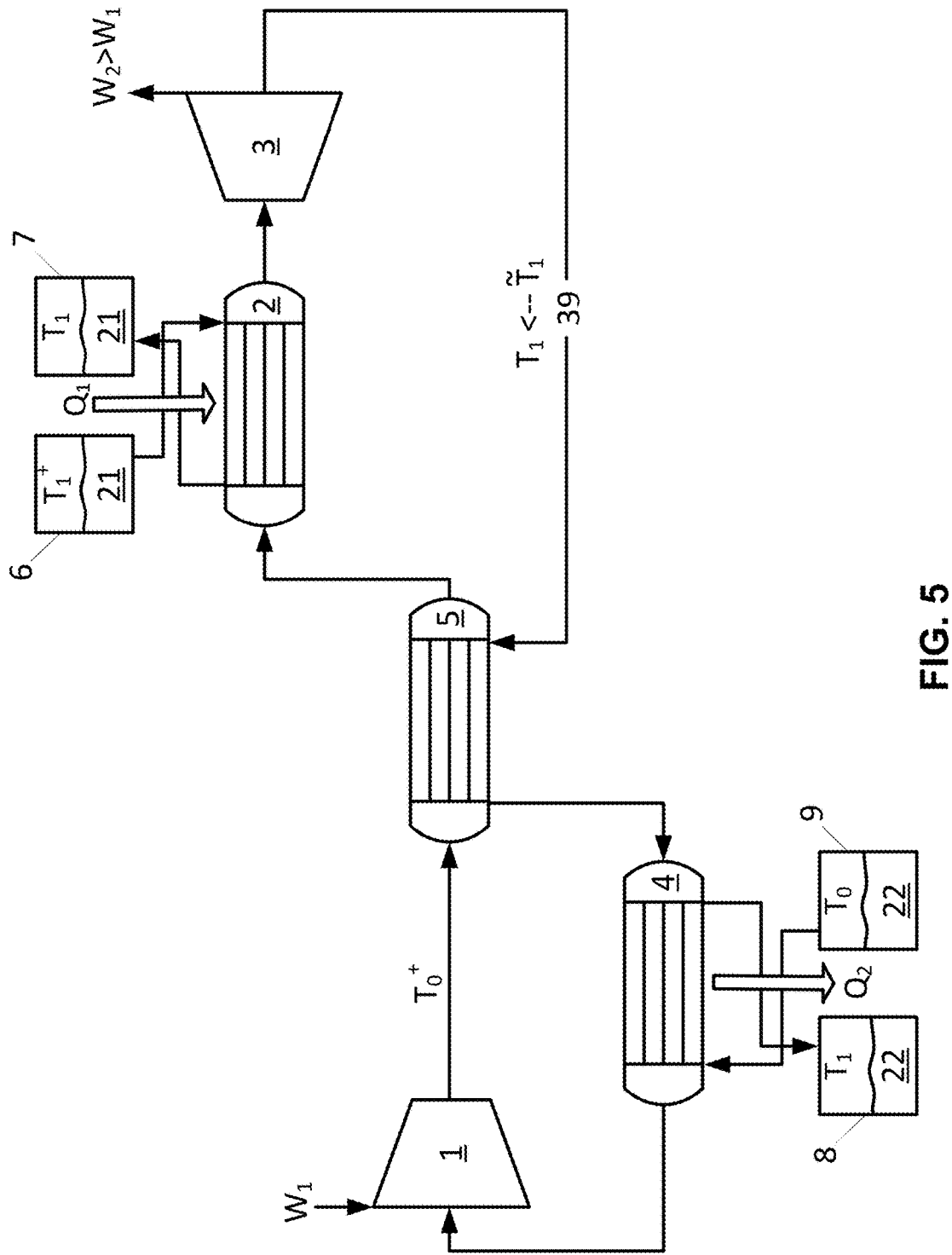
FIG. 5 is a schematic flow diagram of working fluid and heat storage media of a thermal system with a gas-gas heat exchanger for the working fluid in a discharge/heat engine mode.

FIG. 5 is a schematic flow diagram of working fluid and heat storage media of the thermal system in FIG. 4 in a discharge/heat engine mode. Again, the use of the gas-gas heat exchanger can enable use of colder heat storage fluid or a solid heat storage (CTS) and/or colder working fluid on the cold side of the system.

Figure 6B:
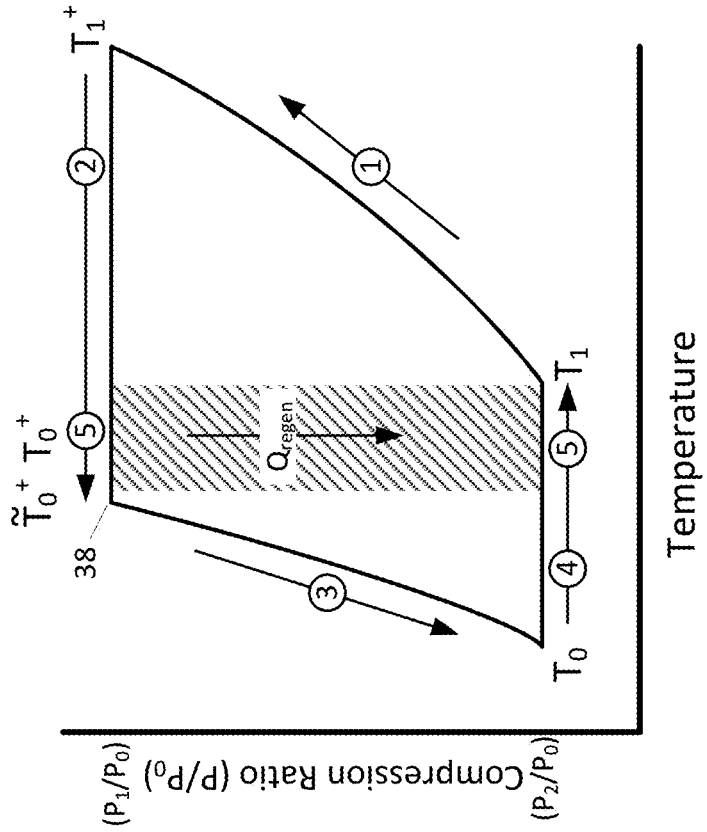
FIG. 6B is a schematic pressure and temperature diagram of the working fluid as it undergoes the discharge cycle in FIG. 5.

FIG. 6B shows a heat storage discharge cycle for the storage system for the storage system in FIG. 5 with a cold side storage medium (e.g., liquid hexane or solid thermal storage medium) capable of going down to 179 K (−94° C.) and a molten salt or a solid thermal storage medium as the hot side storage, and $\eta_c$=0.9 and $\eta_t$=0.95.

During discharge in FIGS. 5 and 6B, the working fluid enters the compressor at $T_0$ and $P_2$, exits the compressor at $T_0^+$ and $P_1$, absorbs heat $Q_{recup}$ from the cold (low pressure) side working fluid in the heat exchanger or recuperator 5, exits the recuperator 5 at $T_1$ and $P_1$, absorbs heat $Q_1$ from the HTS medium 21 in the hot side CFX 2, exiting the hot side CFX 2 at $T_1^+$ and $P_1$, enters the turbine 3 at $\tilde{T}_1^+$ and $P_1$, exits the turbine at $\tilde{T}_1$ and $P_2$, rejects heat to the environment (or other heat sink) in section 39 (e.g., a radiator), rejects heat $Q_{recup}$ to the hot (high pressure) side working fluid in the heat exchanger or recuperator 5, enters the cold side CFX 4 at $T_0^+$ and $P_2$, rejects heat $Q_2$ to the CTS medium 22 in the cold side CFX 4, and finally exits the cold side CFX 4 at $T_0$ and $P_2$, returning to its initial state before entering the compressor.

In some examples, recuperation may enable the compression ratio to be reduced. In some cases, reducing the compression ratio may result in reduced compressor and turbine losses. In some cases, the compression ratio may be at least about 1.2, at least about 1.5, at least about 2, at least about 2.5, at least about 3, at least about 3.5, at least about 4, at least about 4.5, at least about 5, at least about 6, at least about 8, at least about 10, at least about 15, at least about 20, at least about 30, or more.

In some cases, $T_0$ may be at least about 30 K, at least about 50 K, at least about 80 K, at least about 100 K, at least about 120 K, at least about 140 K, at least about 160 K, at least about 180 K, at least about 200 K, at least about 220 K, at least about 240 K, at least about 260 K, or at least about 280 K. In some cases, $T_0^+$ may be at least about 220 K, at least about 240 K, at least about 260 K, at least about 280 K, at least about 300 K, at least about 320 K, at least about 340 K, at least about 360 K, at least about 380 K, at least about 400 K, or more. In some cases, the temperatures $T_0$ and $T_0^+$ can be constrained by the ability to reject excess heat to the environment at ambient temperature due to inefficiencies in components such as turbomachinery. In some cases, the temperatures $T_0$ and $T_0^+$ can be constrained by the operating temperatures of the CTS (e.g., a phase transition temperature). In some cases, the temperatures $T_0$ and $T_0^+$ can be constrained by the compression ratio being used. Any description of the temperatures $T_0$ and/or $T_0^+$ herein may apply to any system or method of the disclosure.

In some cases, $T_1$ may be at least about 350 K, at least about 400 K, at least about 440 K, at least about 480 K, at least about 520 K, at least about 560 K, at least about 600 K, at least about 640 K, at least about 680 K, at least about 720 K, at least about 760 K, at least about 800 K, at least about 840 K, at least about 880 K, at least about 920 K, at least about 960 K, at least about 1000 K, at least about 1100 K, at least about 1200 K, at least about 1300 K, at least about 1400 K, or more. In some cases, $T_1^+$ may be at least about 480 K, at least about 520 K, at least about 560 K, at least about 600 K, at least about 640 K, at least about 680 K, at least about 720 K, at least about 760 K, at least about 800

K, at least about 840 K, at least about 880 K, at least about 920 K, at least about 960 K, at least about 1000 K, at least about 1100 K, at least about 1200 K, at least about 1300 K, at least about 1400 K, at least about 1500 K, at least about 1600 K, at least about 1700 K, or more. In some cases, the temperatures $T_1$ and $T_1^+$ can be constrained by the operating temperatures of the HTS. In some cases, the temperatures $T_1$ and $T_1^+$ can be constrained by the thermal limits of the metals and materials being used in the system. For example, a conventional solar salt can have a recommended temperature range of approximately 560-840 K. Various system improvements, such as, for example, increased round-trip efficiency, increased power and increased storage capacity may be realized as available materials, metallurgy and storage materials improve over time and enable different temperature ranges to be achieved. Any description of the temperatures $T_1$ and/or $T_1^+$ herein may apply to any system or method of the disclosure.

In some cases, the round-trip efficiency $\eta_{store}$ (e.g., electricity storage efficiency) with and/or without recuperation can be at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some implementations, at least a portion of heat transfer in the system (e.g., heat transfer to and from the working fluid) during a charge and/or discharge cycle includes heat transfer with the environment (e.g., heat transfer in sections 38 and 39). The remainder of the heat transfer in the system can occur through thermal communication with thermal storage media (e.g., thermal storage media 21 and 22), through heat transfer in the recuperator 5 and/or through various heat transfer processes within system boundaries (i.e., not with the surrounding environment). In some examples, the environment may refer to gaseous or liquid reservoirs surrounding the system (e.g., air, water), any system or media capable of exchanging thermal energy with the system (e.g., another thermodynamic cycle or system, heating/cooling systems, etc.), or any combination thereof. In some examples, heat transferred through thermal communication with the heat storage media can be at least about 25%, at least about 50%, at least about 60%, at least about 70%, at least about 80%, or at least about 90% of all heat transferred in the system. In some examples, heat transferred through heat transfer in the recuperator can be at least about 5%, at least about 10%, at least about 15%, at least about 20%, at least about 25%, at least about 50%, or at least about 75% of all heat transferred in the system. In some examples, heat transferred through thermal communication with the heat storage media and through heat transfer in the recuperator can be at least about 25%, at least about 50%, at least about 60%, at least about 70%, at least about 80%, at least about 90%, or even about 100% of all heat transferred in the system. In some examples, heat transferred through heat transfer with the environment can be less than about 5%, less than about 10%, less than about 15%, less than about 20%, less than about 30%, less than about 40%, less than about 50%, less than about 60%, less than about 70%, less than about 80%, less than about 90%, less than about 100%, or even 100% of all heat transferred in the system. In some implementations, all heat transfer in the system may be with the thermal storage media (e.g., the CTS and HTS media), and only the thermal storage media may conduct heat transfer with the environment.

Thermal cycles of the disclosure (e.g., the cycles in FIGS. 4 and 5) may be implemented through various configurations of pipes and valves for transporting the working fluid between the turbomachinery and the heat exchangers. In some implementations, a valving system may be used such that the different cycles of the system can be interchanged while maintaining the same or nearly the same temperature profile across at least one, across a subset or across all of counter-flow heat exchangers in the system. For example, the valving may be configured such that the working fluid can pass through the heat exchangers in opposite flow directions on charge and discharge and flow or conveyance directions of the HTS and CTS media are reversed by reversing the direction of the pumps or conveyance systems.

In some implementations, the system may be set up to enable switching between different cycles. Such a configuration may be advantageous as it may reuse at least a portion, or a substantial portion, or a majority, of the same piping and/or connections for the working fluid in both the charging and discharging modes. While the working fluid may change direction between charge and discharge, the temperature profile of the heat exchangers can be kept constant, partially constant, or substantially or fully constant, by changing the direction in which the HTS medium and the CTS medium are pumped or conveyed when switching from charge to discharge and vice-versa, and/or by matching the heat fluxes of the working fluid, the HTS medium and the CTS medium appropriately.

III. Illustrative Baffled Thermoclines in a Brayton Cycle Engine

Figure 7:
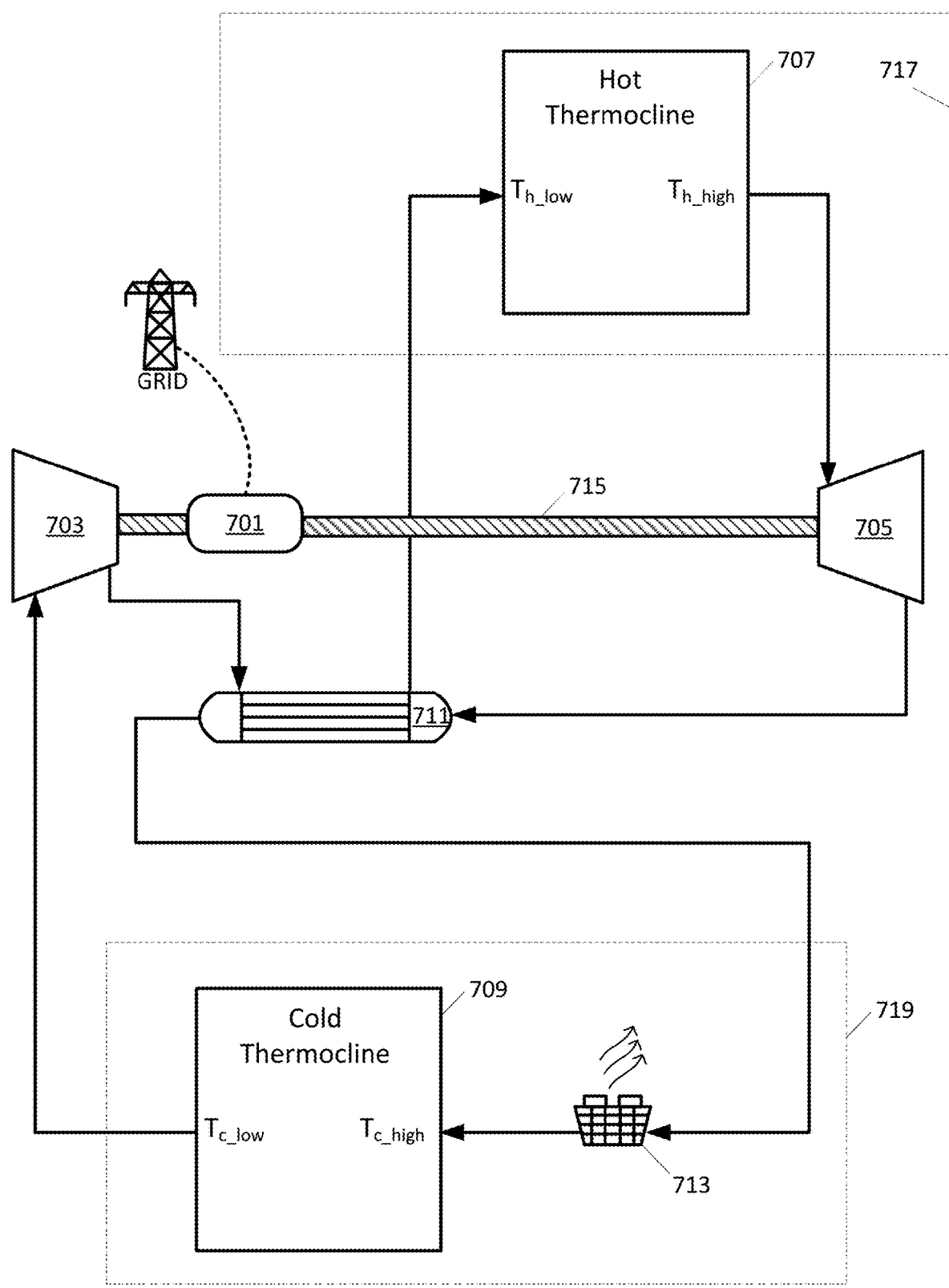
FIG. 7 illustrates a schematic flow diagram according to an example embodiment.

FIG. 7 illustrates a Brayton cycle heat engine configured to generate electrical power and supply such power to an electrical grid. The heat engine may be reversible (i.e., operate as a heat pump) and may take the form of other heat engines and/or reversible heat engines describe herein and may include additional or alternative components than those shown in the illustration. The heat engine may include a generator/motor 701 that may generate electricity or use electricity to operate a compressor 703. The generator/motor 701 may be mechanically coupled to the compressor 703 and a turbine 705. The compressor 703 and the turbine 705 may be coupled to the generator/motor 701 via one or more shafts 715. Alternatively, the compressor 703 and the turbine 705 may be coupled to the generator/motor 701 via one or more gearboxes and/or shafts. The heat engine may use mechanical work to store heat and/or may provide mechanical work from stored heat. The heat engine may have a hot side 717 and a cold side 719.

In one embodiment, the heat engine may include a hot-side thermocline vessel 707 coupled between the compressor 703 and the turbine 705 on the hot side 717. The hot-side thermocline vessel 707 may act as a direct-contact heat exchanger, where a working fluid is in direct contact with a solid thermal medium and at greater than atmospheric pressure. An optional recuperative heat exchanger 711 may be disposed in the working fluid path between the compressor 703 and the hot-side thermocline vessel 707. With the use of the solid thermal medium, which may be effective across a wide temperature range, it may be possible to reduce or eliminate the use of a recuperative heat exchanger.

A cold-side thermocline vessel 709 may be coupled between the turbine 705 and the compressor 703 on the cold side 719. The cold-side thermocline vessel 709 may act as a direct-contact heat exchanger, where a working fluid is in direct contact with a solid thermal medium and at less than atmospheric pressure, wherein the solid thermal medium on the cold side may be different than the solid thermal medium on the hot side. The recuperative heat exchanger 711 may be disposed in the working fluid path between the turbine 705 and the cold-side thermocline vessel 709, such that a working fluid stream downstream of the turbine 705 is in thermal contact with a working fluid stream downstream of the compressor 703.

The hot-side thermocline vessel 707 and the cold-side thermocline vessel 709 are preferably insulated pressure vessels. As used herein, a pressure vessel is intended to refer to a vessel or containment area that can operate at either or both above atmospheric pressure (e.g., 1 to 5 bar, 5 to 30 bar, 30 to 100 bar, or greater) and/or below atmospheric pressure (e.g., $1 \times 10^5$ to $3 \times 10^3$ Pa, $3 \times 10^3$ to $1 \times 10^{-1}$ Pa, $1 \times 10^{-1}$ to $1 \times 10^{-7}$ Pa, or less). They may be insulated to prevent or reduce transmission of heat contained within the vessel to the external environment. They may further be sealed to maintain the pressure of incoming working fluid that may be substantially above or below atmospheric pressure and to maintain a substantially isobaric environment where the working fluid may directly contact the solid thermal medium. The thermocline vessels 707 and 709 may include one or more inlets for receiving the working fluid at non-atmospheric pressure from the closed thermodynamic cycle system, such as a Brayton cycle system, and one or more outlets for dispatching the working fluid at non-atmospheric pressure to the the closed thermodynamic cycle system. The inlets and outlets may be one or more apertures through the exterior walls of the thermocline vessels 707 and 709 and that are connected to the respective working fluid streams and sealed from the atmosphere.

The thermocline vessels 707 and 709 each preferably contain a solid thermal medium. The solid thermal medium may have a structure with porosity sufficient to allow the working fluid to flow through the solid thermal medium. The solid thermal medium may be segregated into a plurality of zones that are defined by a plurality of baffle structures within each pressure vessel. The baffle structures may be configured to limit direct transfer of heat between the solid thermal medium in different zones, whether by conductive or radiative means. The baffles may have one or more fluid channels that allow the working fluid to flow past the baffles and in contact (direct or thermal) with the solid thermal medium. The baffles may allow the thermocline vessels 707 and 709 to maintain a thermocline within the vessel for an extended period of time by reducing the transfer of heat from a hot side of the thermocline to the cold side of the thermocline. As an illustrative example, the thermocline in the hot-side thermocline vessel 707 may exhibit a temperature difference of approximately 1500° C., 1400° C., 1300° C., 1200° C., 1100° C., 1000° C., 900° C., 800° C., 700° C., 600° C., 500° C., 400° C., 300° C., or 200° C. For example, the temperature ($T_{h\_high}$) of the solid thermal medium near the outlet may be approximately 1500° C., 1400° C., 1300° C., 1200° C., 1100° C., 1000° C., 900° C., 800° C., 700° C., 600° C. and the temperature ($T_{h\_low}$) of the solid thermal medium near the inlet may be approximately 200° C. or 100° C. As another example, the thermocline in the cold-side thermocline vessel 709 may exhibit a temperature difference of approximately 400° C., 300° C., 200° C., or 100° C. For example, the temperature ($T_{c\_high}$) of the solid thermal medium near the inlet may be approximately 200° C., 100° C., 70° C., 30° C. or 0° C. and the temperature ($T_{c\_low}$) of the solid thermal medium near the outlet may be approximately −30° C., −100° C., or −200° C. . Each of the thermocline vessels may have one or more pressure sealed access ports to load or unload the solid thermal medium for thermal charging, maintenance, or other access requirements.

The heat engine illustrated in FIG. 7 may also have fluid paths configured to allow it to operate without a recuperator (as in FIG. 2) and/or to operate reversibly and function to store excess electrical energy in the form of thermal energy, similar to the cycle shown in FIG. 4 or FIG. 1 (without a recuperator), where the hot side heat exchanger 2 and associated tanks 6 and 7 and HTS medium 21 are replaced with thermocline 707 and the cold side heat exchanger 4 and associated tanks 8 and 9 and CTS medium 22 are replaced with thermocline 709, and the fluid flow paths are as indicated in FIG. 1, 2 or 4. Due to inefficiencies likely present in the system, excess heat may need to be rejected in the discharge or charge cycles. Heat rejection devices may be inserted into the fluid paths of the described embodiments without departing from the claimed subject matter.

As an example embodiment only, in a discharge cycle, a heat rejection device 713, such as a cooling tower, may be disposed in, or coupled to, the working fluid stream between the turbine 705 and the cold-side thermocline vessel 709. The heat rejection device 713 may eject heat from the system, where the heat may be carried into the heat rejection device 713 by the working fluid and ejected to the atmosphere or other heat sink.

Figure 8:
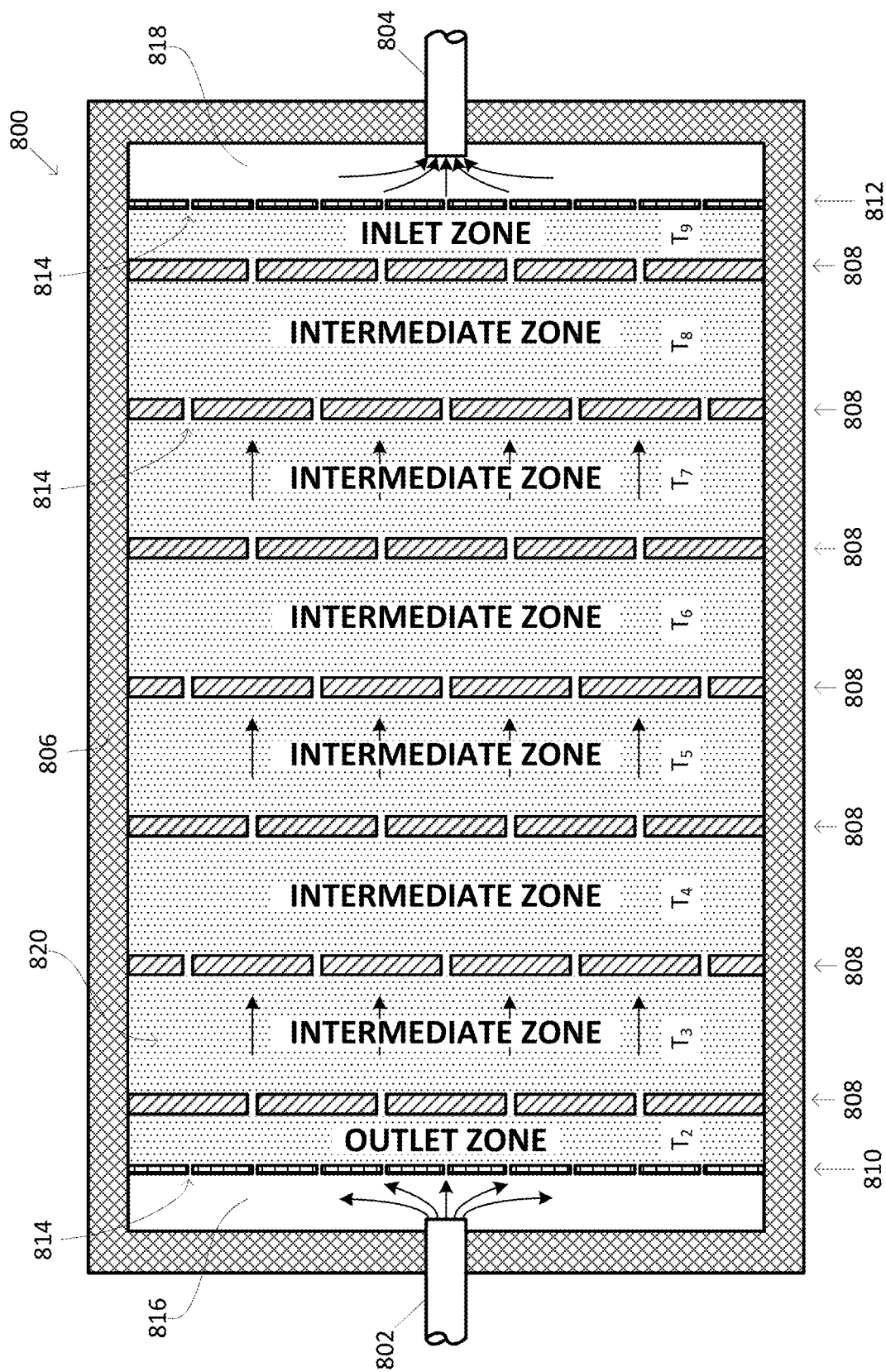
FIG. 8 illustrates a schematic arrangement, in cut-away view, of a baffled thermocline pressure vessel according to an example embodiment.

FIG. 8 illustrates a schematic arrangement, in cut-away view, of a baffled thermocline pressure vessel according to an example embodiment. The thermocline vessel 800 may include a pressure vessel 806 that is insulated. The pressure vessel 806 may take various forms sufficient to withstand the pressure of the working fluid and to prevent or reduce heat transfer between the solid thermal medium and the external environment. For example, the pressure vessel 806 may be a container. The outside walls of the container may include one or more materials designed to withstand pressure and/or to minimize heat transfer. For example, the walls may include, internal insulation, an interior surface of refractory material, a structural steel core, and an external insulation and/or protective material capable of withstanding long-term environmental exposure. Pressure sealed access ports may be included within the walls.

The thermocline vessel 800 may include an inlet 802 for working fluid from the Brayton cycle system and an outlet 804 for working fluid to the Brayton cycle system. The inlet 802 and outlet 804 may each be simple pipe ports with an opening into the interior of the pressure vessel 806 and/or they may include more complex structures such as distribution plenums that connect to external piping containing the working fluid.

The thermocline vessel 800 may include baffle structures in one or more configurations, such as baffle structures 808, 810, and 812. Each of the baffle structures 808, 810, 812 may be an insulating wall and may include fluid channels 814 that allow passage of working fluid past the baffle structures. For clarity of the illustration in FIG. 8, only a few of the fluid channels 814 are labeled. The fluid channels 814 may be apertures through the baffle structure 810. As illustrated in FIG. 8, the baffles 808, 810, 812 may extend completely across the thermocline vessel 800. Baffle structure 814 may partially or completely define an inlet region 816 that may be filled with incoming working fluid from the inlet 802. Baffle structure 810 may include an arrangement of fluid channels 814 that allows widespread distribution of the working fluid across a span of the interior of the thermocline vessel 800. For example, baffle structure 810 may have more or less fluid channels 814 or differently spaced or configured fluid channels 814 than other baffle structures in the thermocline vessel 800. Similarly, baffle structure 812 may partially or completely define an outlet region 818 that may be filled with incoming working fluid. Baffle structure 812 may include an arrangement of fluid channels 814 that allows widespread collection of the working fluid from across a span of the interior of the thermocline vessel 800. For example, baffle structure 812 may have more or less fluid channels or differently spaced or configured fluid channels than other baffle structures in the thermocline vessel 800.

Baffle structures 808, together and/or in conjunction with baffle structures 810, 812 may partially or completely define a plurality of zones within the insulated pressure vessel 800. Each zone may contain a solid thermal medium 820. The baffle structures 808 are preferably configured to limit direct transfer of heat between the solid thermal medium 820 in different zones, such as conduction or radiation of heat between a bolus of the solid thermal medium in one zone and a bolus of the solid thermal medium in a different zone, while allowing passage of a working fluid past the baffle structures and into contact with the solid thermal medium 820.

In the thermocline vessel 800, each of the zones may contain the solid thermal medium 820 at a different temperature, forming a thermocline configuration as illustrated in FIG. 8 by $T_2$ through $T_8$. A zone proximate to the inlet (i.e., an "inlet zone") may be at a temperature $T_2$. A zone proximate to the outlet (i.e., an "outlet zone") may be at a different temperature $T_9$. Each of the zones between the inlet zone and the outlet zone may be at differing temperatures that form a gradient between $T_2$ and $T_8$. For example, in a hot-side thermocline vessel, the thermocline may take the form of $T_9>T_8>T_7>T_6>T_5>T_4>T_3>T_2$. As further illustration, the solid thermal medium 820 in the outlet zone may be at approximately $T_9=600°$ C. and the solid thermal medium 820 in the inlet zone may be at approximately $T_2=400°$ C. As another example, in a cold-side thermocline vessel, the thermocline may take the form of $T_9<T_8<T_7<T_6<T_5<T_4<T_3<T_2$. As further illustration, the solid thermal medium 820 in the outlet zone may be at approximately $T_9=-70°$ C. and the solid thermal medium 820 in the inlet zone may be at approximately $T_2=30°$ C.

Figure 9:
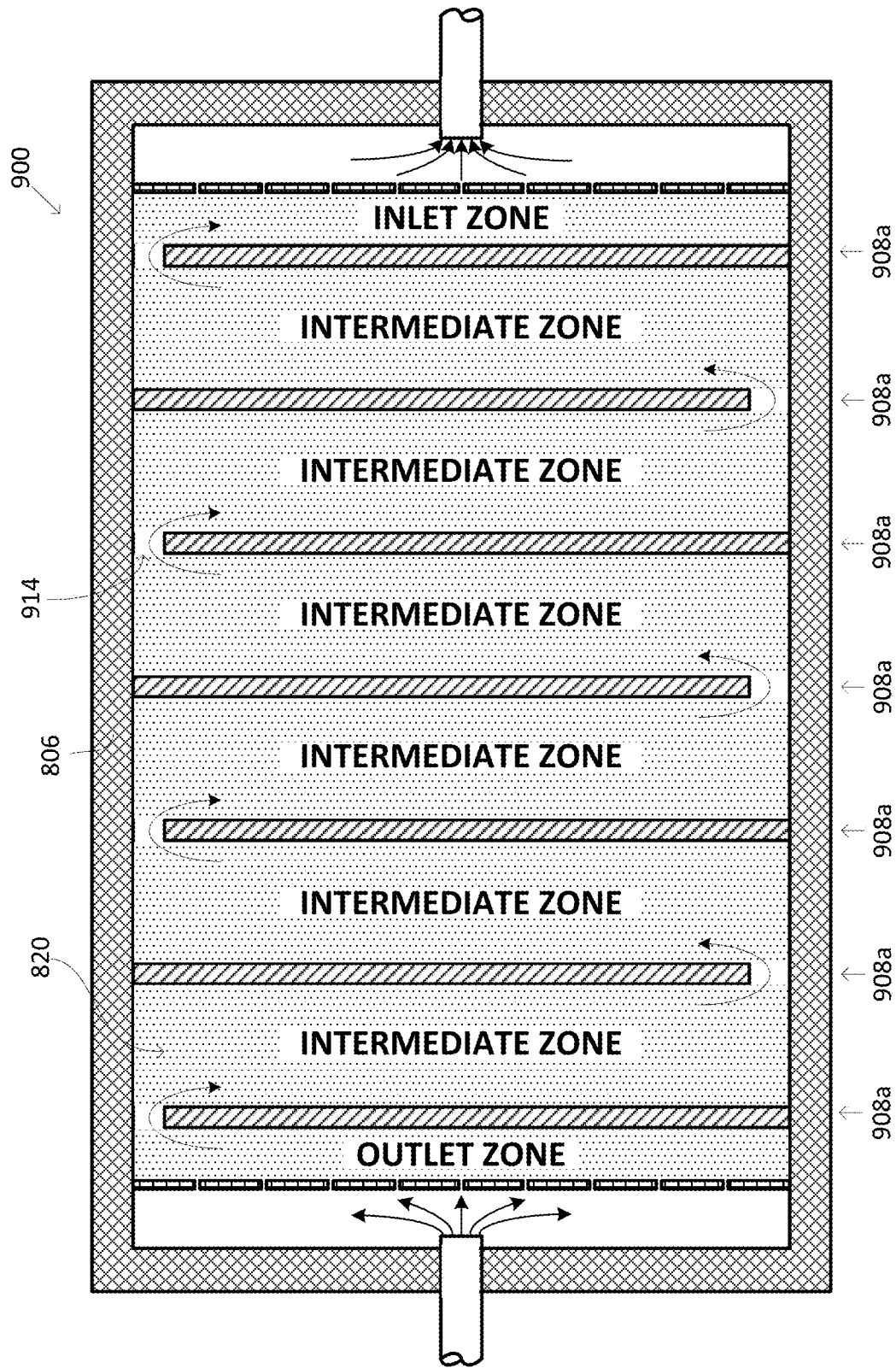
FIG. 9 illustrates a schematic arrangement, in cut-away view, of a baffled thermocline pressure vessel according to an example embodiment.

FIG. 9 illustrates another schematic arrangement, in cut-away view, of a baffled thermocline pressure vessel according to an example embodiment. The thermocline vessel 900 illustrated in FIG. 9 is similar to the embodiment in FIG. 8 except that the baffle structures 908 do not extend completely across thermocline vessel 800, as illustrated in FIG. 8. The baffle structures 908 may be insulating walls and the fluid channels 914 may be formed by spaces between the ends of the insulating walls and an interior wall of the pressure vessel. The resulting serpentine flow path for the working fluid may provide a greater residence time for the working fluid in the thermocline vessel 900 when compared to the more direct flow path of the thermocline vessel 800.

Figure 10:
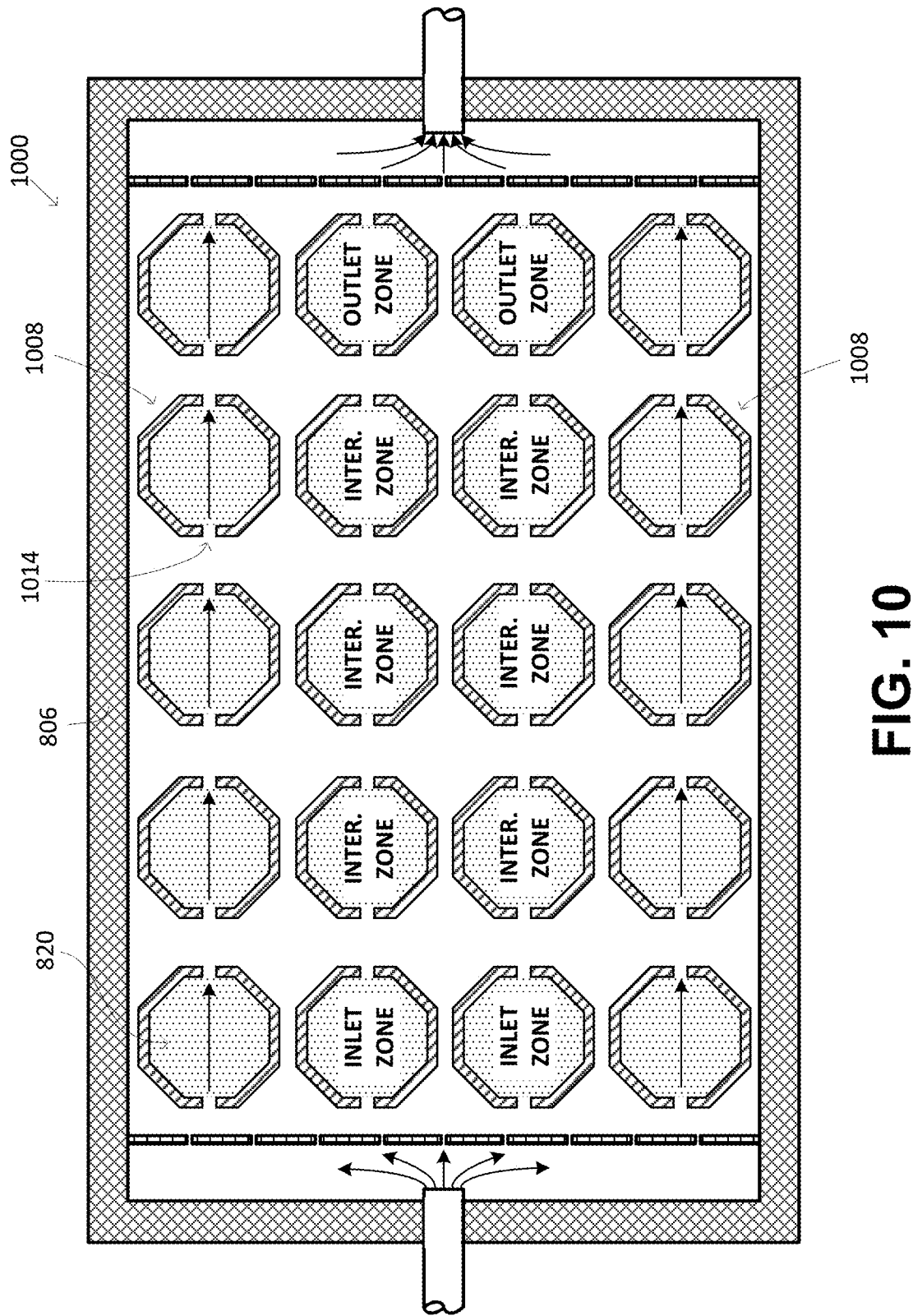
FIG. 10 illustrates a schematic arrangement, in cut-away view, of a baffled thermocline pressure vessel according to an example embodiment.

FIG. 10 illustrates another schematic arrangement, in cut-away view, of a baffled thermocline pressure vessel according to an example embodiment. The thermocline vessel 1000 is similar to the embodiments in FIGS. 8 and 9 except that the baffle structures 1008 are insulated chambers which define zones for the solid thermal medium 820 within the chambers. Each of the baffle structures 1008 include one or more fluid channels 1014 that allow a working fluid to enter the chambers and contact the solid thermal medium 820. In one example, the baffle structures 1008 may be formed as permanent constructions, for examples with walls of refractory brick or other materials with gaps or apertures through the walls. In another example, the baffle structures 1008 may be mobile containers such as crucibles that may be placed into, removed from, or moved within the pressure vessel 806. Such an arrangement may reduce the overall heat transfer between the working fluid and the solid thermal medium 820, but may have other benefits such as flexibility of design, ease of maintenance, and/or recharging the thermal energy in the system.

Figure 11:
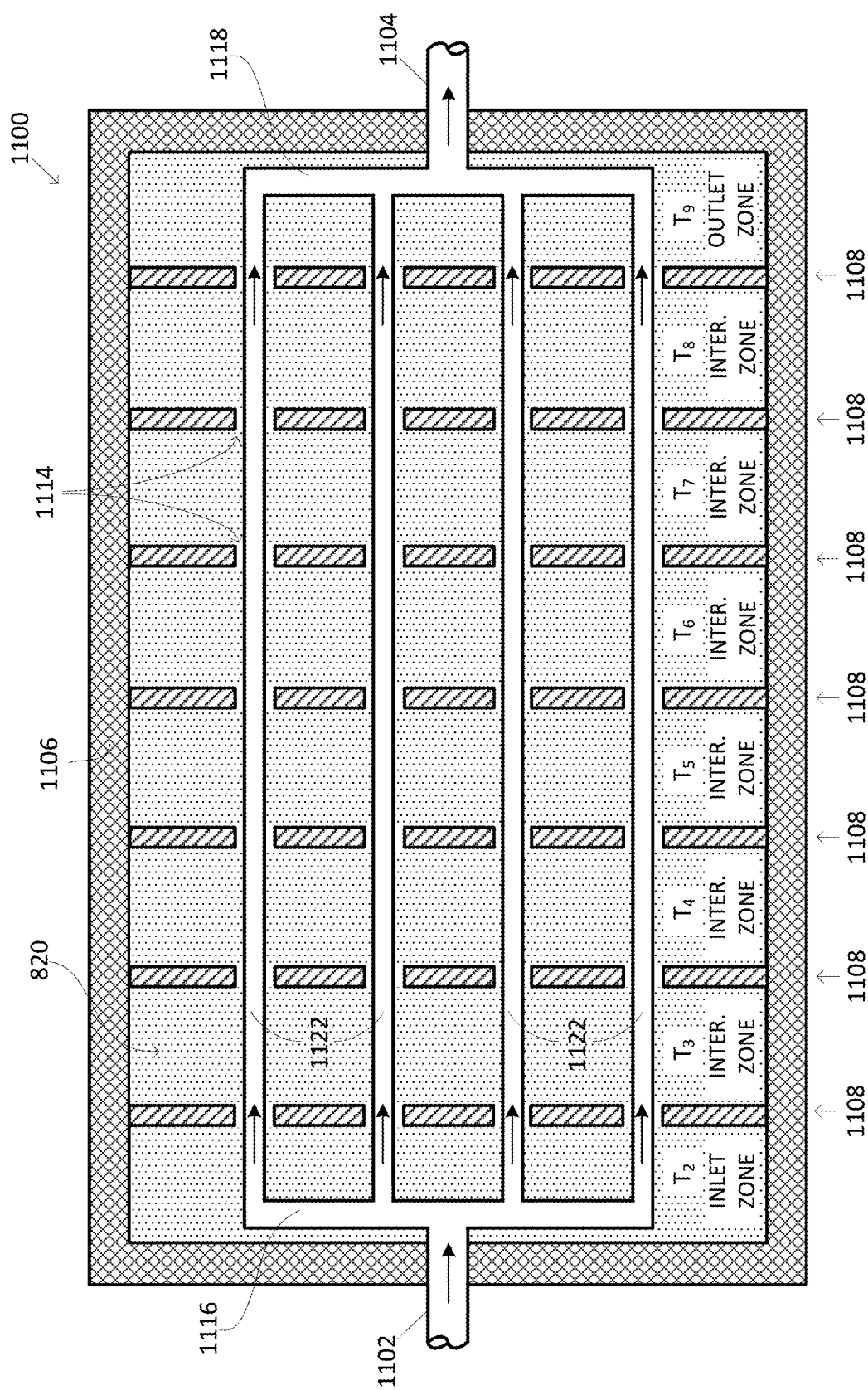
FIG. 11 illustrates a schematic arrangement, in cut-away view, of a baffled thermocline vessel with a runner, according to an example embodiment.

FIG. 11 illustrates another schematic arrangement, in cut-away view, of a baffled thermocline vessel with a runner system according to an example embodiment. The thermocline vessel 1100 illustrated in FIG. 11 is similar to the embodiment in FIG. 8 except that the working fluid is confined within runners instead of flowing throughout the vessel 1106. Accordingly, vessel 1106 may be operable at atmospheric pressure. The working fluid may enter the vessel 1100 at inlet 1102, be distributed through a plenum 1116 to a series of runners 1122, enter a plenum 118, and exit the vessel 1100 at outlet 1104. The runners 1122 are configured to allow heat to transfer between the solid thermal medium 820 and the working fluid in the runners 1122. Heat transfer may be by conduction, convection (e.g., from an atmosphere within the vessel 1106), and/or radiative action. Preferably the runners 1122 are in direct contact with the solid thermal medium, but they may be in non-direct thermal contact only.

As an example only, the baffle structures 1108 may be insulating walls similar to those described with with respect to FIGS. 8 and 9, except that the fluid channels 1114 are sized to allow the runners containing the working fluid to pass the walls.

Figure 12:
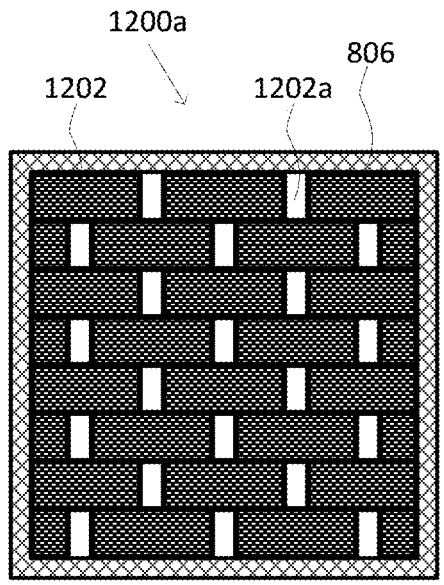
FIGS. 12 illustrates an example embodiment of a baffle structures inside a thermocline pressure vessel.
Figure 13:
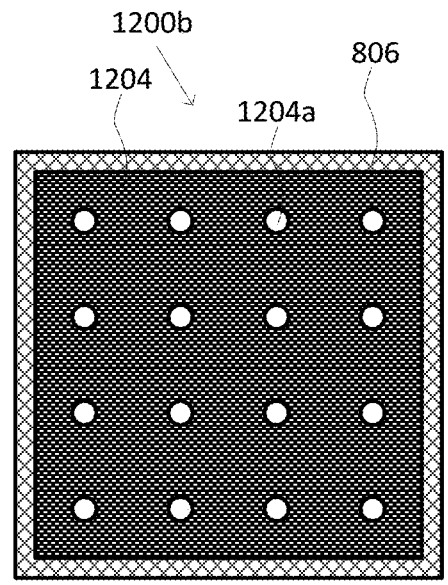
FIGS. 13 illustrates an example embodiment of a baffle structures inside a thermocline pressure vessel.
Figure 14:
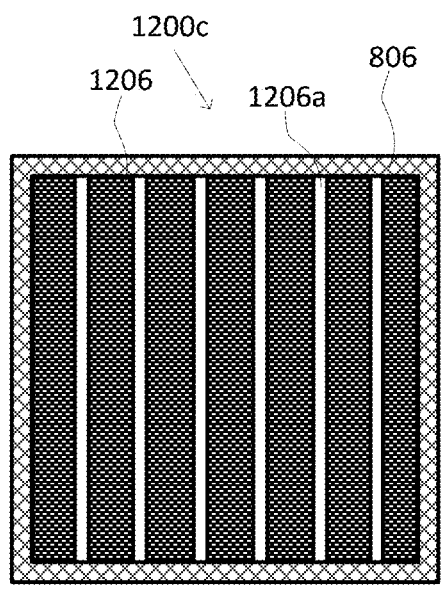
FIGS. 14 illustrates an example embodiment of a baffle structures inside a thermocline pressure vessel.
Figure 15:
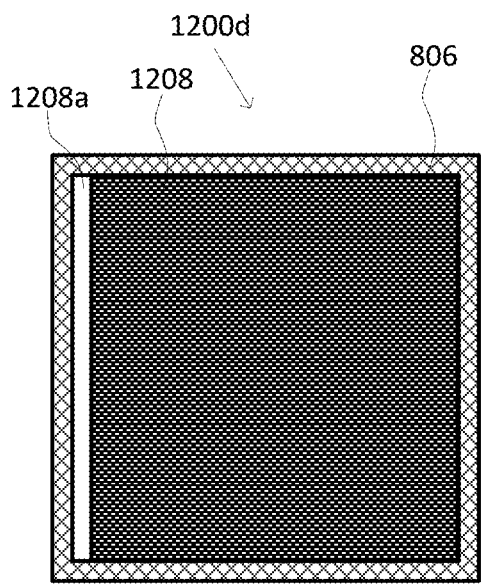
FIGS. 15 illustrates an example embodiment of a baffle structures inside a thermocline pressure vessel.

FIGS. 12 through 15 illustrate example embodiments of forms of baffle structures inside a thermocline vessel, as viewed in a direction of working fluid flow. Each of the illustrations reflects implementation in a pressure vessel 806, but the example baffle structures could be implemented in a non-pressurized thermocline vessel such as the runner system illustrated in FIG. 11. FIG. 12 illustrates a baffle structure 1200a where the fluid channels are apertures 1202a between components 1202 (e.g., bricks) used to construct the baffle structure. FIG. 13 illustrates a baffle structure 1200b where the fluid channels are apertures 1204a through a perforated material 1204. FIG. 14 illustrates a baffle structure 1200c where the fluid channels are gaps 1206a between components 1206 (e.g., slats or rods) used to construct the baffle structure. FIG. 15 illustrates a baffle structure 1200d where the fluid channel is a gap 1208a between an interior surface of the pressure vessel 806 and the wall 1208..

Preferably the baffle structures 1200a, 1200b, 1200c, and 1200d have insulating properties to limit the conduction of heat from the solid thermal medium on one side of the structure to the solid thermal medium on the other side of the structure. The fluid channels may be sized or located to limit or prevent the movement of the solid thermal medium through the aperture. Alternatively or additionally, the fluid channels may be sized, located, and/or shaped to limit the passage of radiative heat transfer. For example, a fluid channel may be smaller than a pellet of the solid thermal medium and/or a fluid channel may be angled or convoluted in form such that there is no or limited line-of-sight between the solid thermal medium on one side of the baffle structure and the solid thermal medium on the other side of the baffle structure.

VI. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A thermocline vessel system comprising: a first thermocline vessel and a second thermocline vessel, each thermocline vessel arranged in communication with a portion of a reversible Brayton cycle system, and comprising:
   an insulated pressure vessel;
   an inlet for receiving a working fluid, wherein the inlet is configured to receive the working fluid at a non-atmospheric working pressure from the reversible Brayton cycle system;
   an outlet for dispatching the working fluid, wherein the outlet is configured to dispatch the working fluid to the reversible Brayton cycle system,
   wherein, in a power generation mode, the inlet of one of the thermocline vessels receives working fluid from an auxiliary heat exchanger of the reversible Brayton cycle system, the outlet of the one of the thermocline vessels dispatches working fluid to a compressor of the reversible Brayton cycle system, and wherein the auxiliary heat exchanger removes heat from the reversible Brayton cycle system;
   a solid thermal medium within the insulated pressure vessel and having porosity sufficient to allow the working fluid to flow through the solid thermal medium;
   a plurality of baffle structures defining a plurality of zones within the insulated pressure vessel, wherein the solid thermal medium is located within the plurality of zones, wherein each baffle structure is configured to limit direct transfer of heat between the solid thermal medium in different zones; and
   one or more fluid channels configured to channel the working fluid past the baffles and in contact with the solid thermal medium.

2. The thermocline vessel system of claim 1, wherein the solid thermal medium is selected from the group consisting of rock, sand, dirt, gravel, clay, minerals, metal, metal oxide, ceramic, cermet, alumina, silica, refractory materials, and combinations thereof.

3. The thermocline vessel system of claim 1, wherein the solid thermal medium has a form selected from the group consisting of slab, brick, platonic solid, sphere, cylinder, fabric, mesh, and combinations thereof.

4. The thermocline vessel system of claim 1, wherein the working fluid within the thermocline vessel is at a pressure greater than 3 bar.

5. The thermocline vessel system of claim 1, wherein the working fluid within the thermocline vessel is at a pressure less than atmospheric pressure.

6. The thermocline vessel system of claim 1, wherein the working fluid is selected from the group consisting of air, argon, helium, carbon dioxide, and combinations thereof.

7. The thermocline vessel system of claim 1, wherein the plurality of zones comprise an inlet zone proximate to the inlet, an outlet zone proximate to the outlet, and one or more intermediate zones disposed between the inlet zone and the outlet zone.

8. The thermocline vessel system of claim 7, wherein the solid thermal medium in the inlet zone is at a first temperature, wherein the solid thermal medium in the outlet zone is at a second temperature, and wherein the solid thermal medium in each of the one or more intermediate zones is at a temperature between the first temperature and second temperature.

9. The thermocline vessel system of claim 8, wherein the magnitude of the difference between the first temperature and the second temperature is greater than 200° C.

10. The thermocline vessel system of claim 1, wherein at least one of the plurality of baffle structures comprises an insulating wall extending completely across the pressure vessel, wherein the one or more fluid channels comprise a plurality of apertures through the wall.

11. The thermocline vessel system of claim 1, wherein at least one of the baffle structures of the plurality of baffle structures comprises an insulating wall extending partially across an interior space of the thermocline vessel, wherein at least one of the fluid channels of the one or more fluid channels comprise a space between an end of the insulating wall and an interior wall of the pressure vessel.

12. The thermocline vessel system of claim 1, wherein at least one of the baffle structures of the plurality of baffle structures comprises a perforated material extending completely across the pressure vessel, wherein the one or more fluid channels comprise perforations in the perforated material.

13. The thermocline vessel system of claim 1, wherein at least one of the baffle structures of the plurality of baffle structures comprises an insulated chamber within the pressure vessel, wherein the one or more fluid channels comprise a plurality of apertures through one or more walls of the insulated chamber.

14. A thermocline vessel system comprising:
   a hot side thermocline vessel and a cold side thermocline vessel, each thermocline vessel arranged in communication with a portion of a reversible Brayton cycle system, and comprising:
   an insulated pressure vessel;
   an inlet for receiving a working fluid, wherein the inlet is configured to receive the working fluid at a non-atmospheric working pressure from the reversible Brayton cycle system, wherein the cold side thermocline vessel is arranged downstream from an auxiliary heat exchanger for removing heat from the reversible Brayton cycle system in a power generation mode;
   an outlet for dispatching the working fluid, wherein the outlet is configured to dispatch the working fluid to the reversible Brayton cycle system;
   a solid thermal medium within the insulated pressure vessel and having porosity sufficient to allow the working fluid to flow through the solid thermal medium;
   a plurality of baffle structures defining a plurality of zones within the insulated pressure vessel, wherein the solid thermal medium is located within the plurality of zones, wherein each baffle structure is configured to limit direct transfer of heat between the solid thermal medium in different zones; and
   one or more fluid channels configured to channel the working fluid past the baffles and in contact with the corresponding solid thermal medium.

15. The thermocline vessel system of claim 14, wherein the solid thermal medium of at least one of the hot and cold thermocline vessels is selected from the group consisting of rock, sand, dirt, gravel, clay, minerals, metal, metal oxide, ceramic, cermet, alumina, silica, refractory materials, and combinations thereof.

16. The thermocline vessel system of claim 14, wherein the solid thermal medium of the at least one of the hot and cold thermocline vessels has a form selected from the group consisting of slab, brick, platonic solid, sphere, cylinder, fabric, mesh, and combinations thereof.

17. The thermocline vessel system of claim 14, wherein the working fluid within at least one of the hot and cold thermocline vessels is at a pressure greater than 3 bar.

18. The thermocline vessel system of claim 14, wherein the working fluid within at least one of the hot and cold thermocline vessels is at a pressure less than atmospheric pressure.

19. The thermocline vessel system of claim 14, wherein the working fluid within at least one of the hot and cold thermocline vessels is selected from the group consisting of air, argon, helium, carbon dioxide, and combinations thereof.

20. The thermocline vessel system of claim 14, wherein the plurality of zones within at least one of the hot and cold thermocline vessels comprises an inlet zone proximate to the inlet, an outlet zone proximate to the outlet, and one or more intermediate zones disposed between the inlet zone and the outlet zone.

21. The thermocline vessel system of claim 19, wherein the solid thermal medium in the inlet zone is at a first temperature, wherein the solid thermal medium in the outlet zone is at a second temperature, and wherein the solid thermal medium in each of the one or more intermediate zones is at a temperature between the first temperature and second temperature.

22. The thermocline vessel system of claim 20, wherein the magnitude of the difference between the first temperature and the second temperature is greater than 200° C.

23. The thermocline vessel system of claim 14, wherein at least one of the plurality of baffle structures of at least one of the hot and cold thermocline vessels comprises an insulating wall extending completely across the pressure vessel, wherein the one or more fluid channels comprise a plurality of apertures through the wall.

24. The thermocline vessel system of claim 14, wherein at least one of the baffle structures of the plurality of baffle structures of at least one of the hot and cold thermocline vessels comprises an insulating wall extending partially across an interior space of the thermocline vessel, wherein at least one of the fluid channels of the one or more fluid channels comprise a space between an end of the insulating wall and an interior wall of the pressure vessel.

25. The thermocline vessel system of claim 14, wherein at least one of the baffle structures of the plurality of baffle structures of at least one of the hot and cold thermocline vessels comprises a perforated material extending completely across the pressure vessel, wherein the one or more fluid channels comprise perforations in the perforated material.

26. The thermocline vessel system of claim 14, wherein at least one of the baffle structures of the plurality of baffle structures of at least one of the hot and cold thermocline vessels comprises an insulated chamber within the pressure vessel, wherein the one or more fluid channels comprise a plurality of apertures through one or more walls of the insulated chamber.

* * * * *